(12) United States Patent
Sugiura et al.

(10) Patent No.: US 8,820,512 B2
(45) Date of Patent: Sep. 2, 2014

(54) WORKPIECE SUPPLYING APPARATUS AND WORKPIECE SUPPLYING METHOD

(75) Inventors: Shinya Sugiura, Kosai (JP); Hiroki Sugiura, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 142 days.

(21) Appl. No.: 13/533,460

(22) Filed: Jun. 26, 2012

(65) Prior Publication Data
US 2013/0001046 A1   Jan. 3, 2013

(30) Foreign Application Priority Data

Jun. 30, 2011 (JP) ................................. 2011-146362
Dec. 21, 2011 (JP) ................................. 2011-280382
Dec. 21, 2011 (JP) ................................. 2011-280383

(51) Int. Cl.
*B65G 37/00* (2006.01)
*B65G 17/32* (2006.01)
*B65G 17/08* (2006.01)

(52) U.S. Cl.
CPC ............... *B65G 17/32* (2013.01); *B65G 17/08* (2013.01)
USPC ............... 198/347.1; 198/867.11; 198/803.14

(58) Field of Classification Search
CPC ...... B65G 17/066; B65G 17/32; B65G 17/08; B65G 17/002; B65G 47/5122; B65G 47/5131; B65G 47/5127; B65H 2220/01
USPC ................. 198/347.1, 347.3, 803.14, 803.15, 198/867.11, 867.12
See application file for complete search history.

(56) References Cited

U.S. PATENT DOCUMENTS

| 4,418,815 | A | * | 12/1983 | Anderson et al. | 198/484.1 |
| 5,119,934 | A | * | 6/1992 | Karasawa et al. | 206/714 |
| 5,630,499 | A | * | 5/1997 | Louden et al. | 198/867.14 |
| 5,690,233 | A | * | 11/1997 | Kaneko | 206/714 |
| 5,967,328 | A | * | 10/1999 | Ziberna | 206/714 |
| 7,127,805 | B2 | * | 10/2006 | Watson | 29/827 |
| 2005/0160840 | A1 | * | 7/2005 | Allmendinger | 73/863.51 |
| 2006/0157381 | A1 | * | 7/2006 | Adams et al. | 206/713 |
| 2006/0243559 | A1 | * | 11/2006 | Martelli | 198/347.1 |
| 2009/0104859 | A1 | * | 4/2009 | Weiland | 451/296 |
| 2012/0227256 | A1 | * | 9/2012 | Clew et al. | 29/816 |

FOREIGN PATENT DOCUMENTS

JP    2010-143685    7/2010

* cited by examiner

*Primary Examiner* — James R Bidwell
(74) *Attorney, Agent, or Firm* — Christensen Fonder P.A.

(57) ABSTRACT

A workpiece supplying apparatus includes a plurality of carriers, a carrier case, a first gear pair, a guide, and a second gear pair. Each carrier includes a base and a plurality of holding portions, which project from a surface of the base. The holding portions are arranged in a one-dimensional manner and each hold workpieces. The carrier case accommodates the carriers. The first gear pair draws out each carrier from the carrier case toward a workpiece unloading position along a drawing direction. The guide guides the carrier drawn out by the first gear pair in a direction that differs from the drawing direction while bending the carrier so that its rear surface is located at an inner side. The second gear pair collects the carrier guided by the guide.

23 Claims, 15 Drawing Sheets

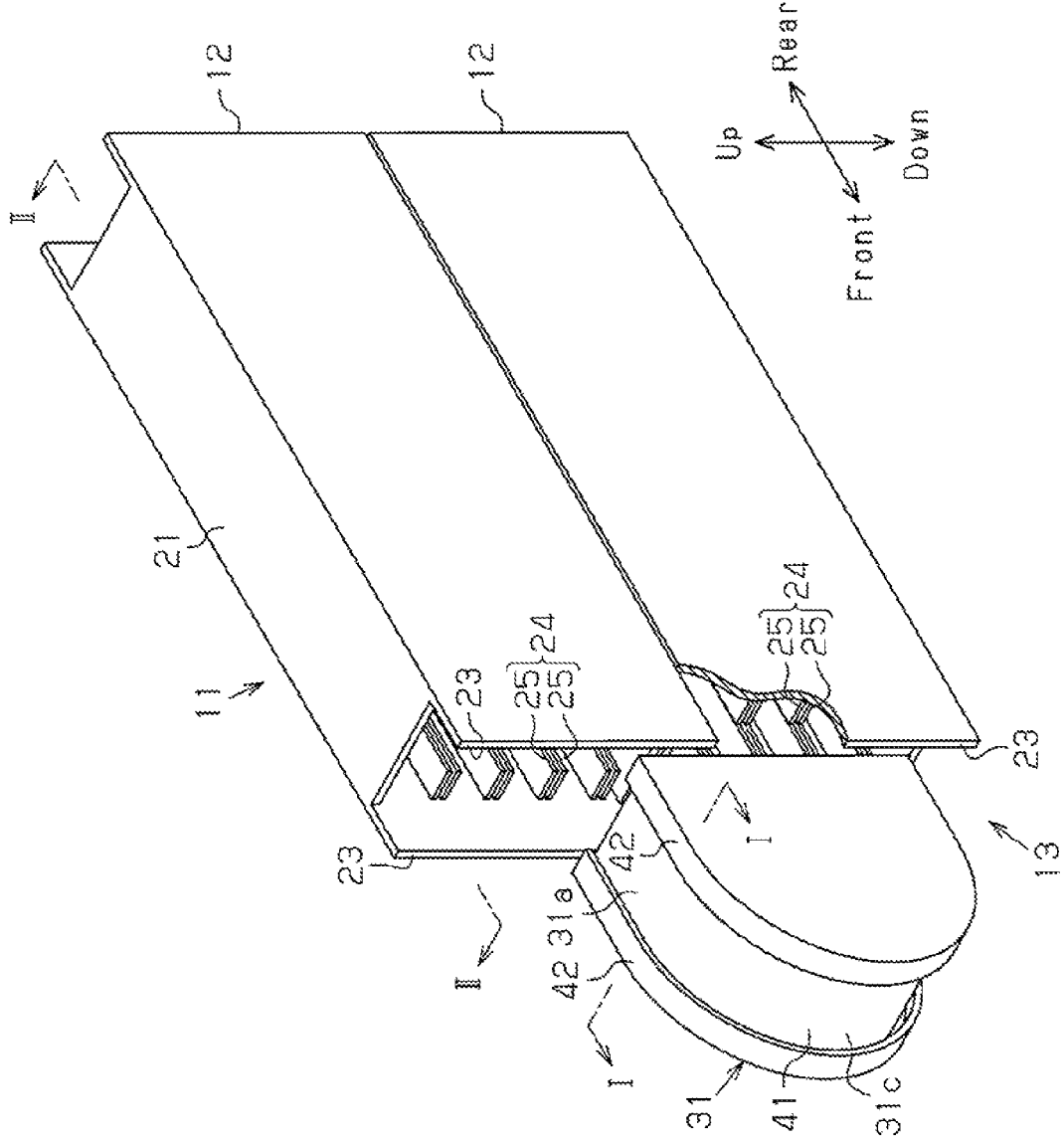

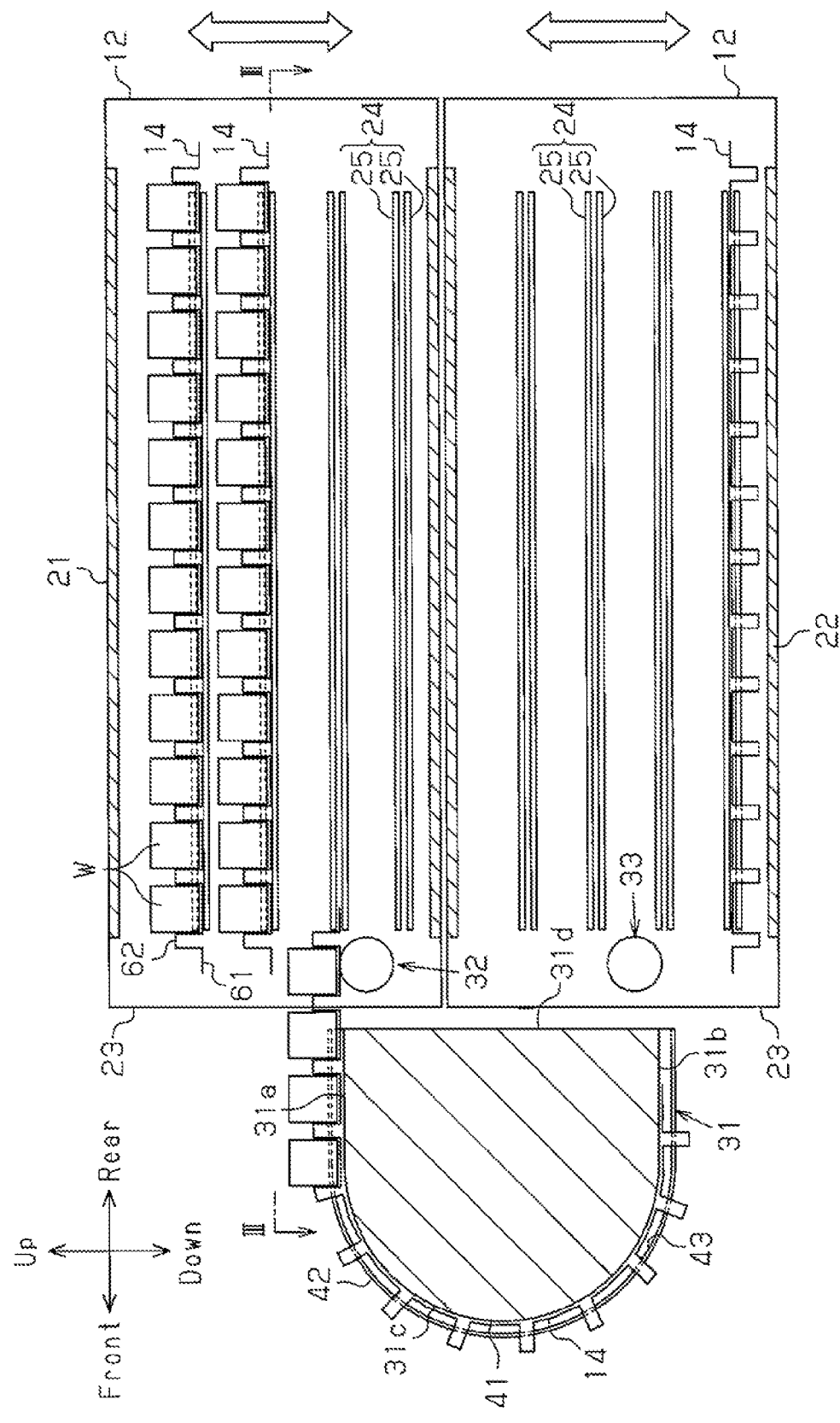

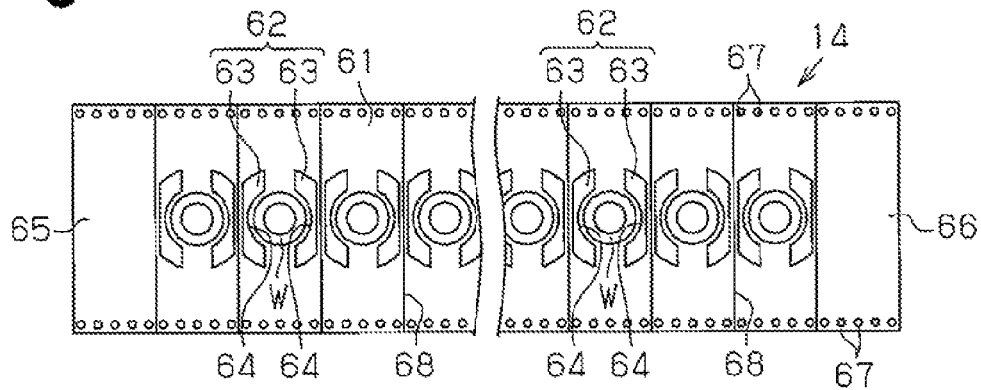
Fig.4A
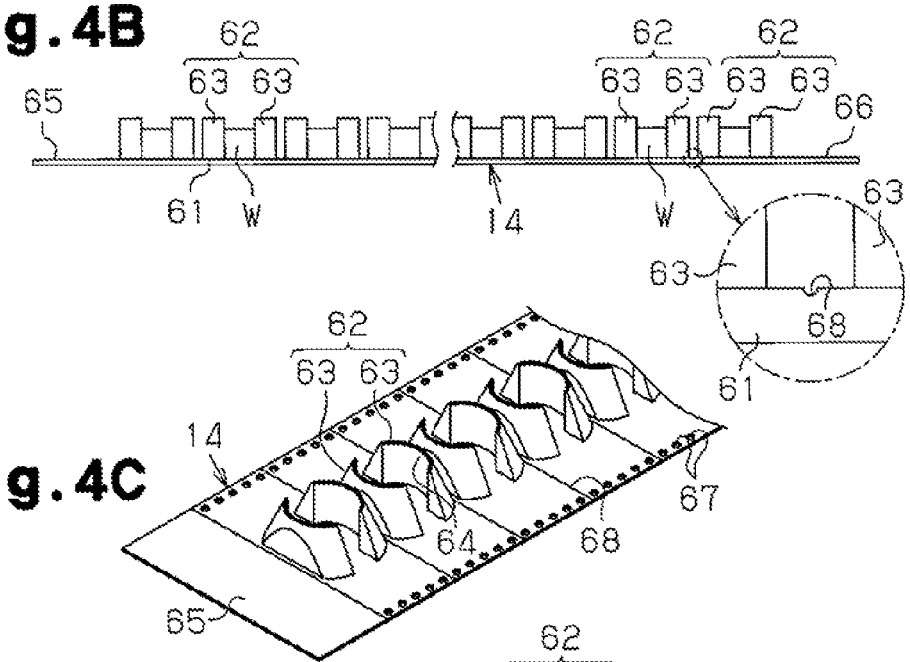
Fig.4B
Fig.4C
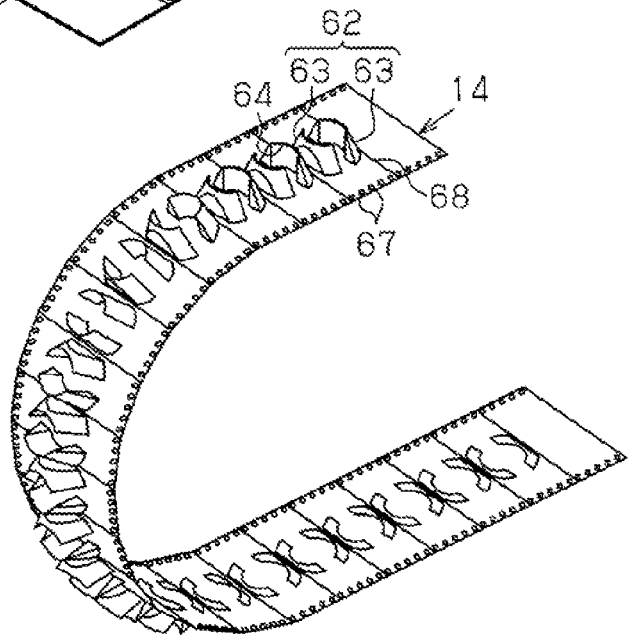
Fig.4D

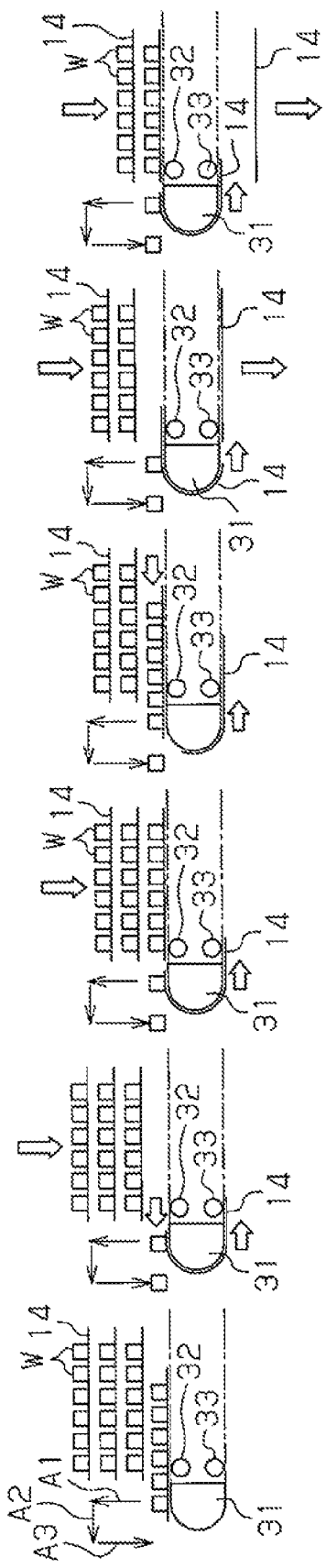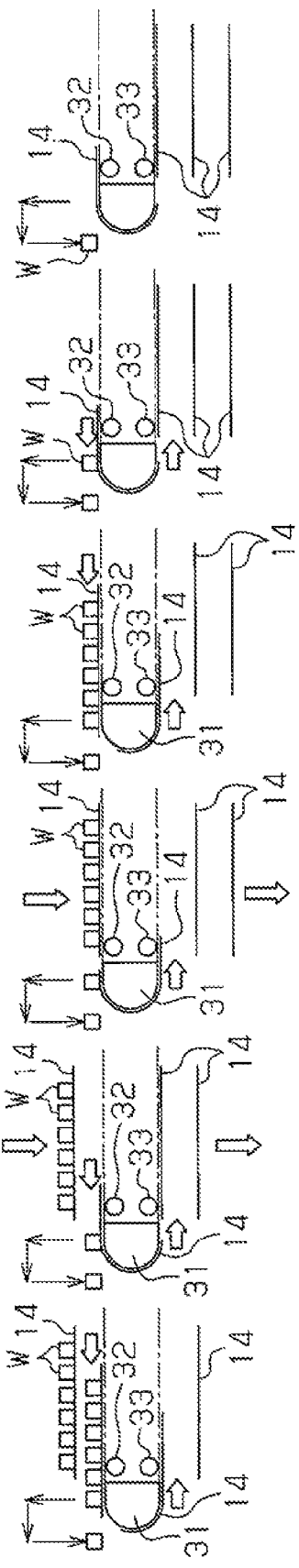

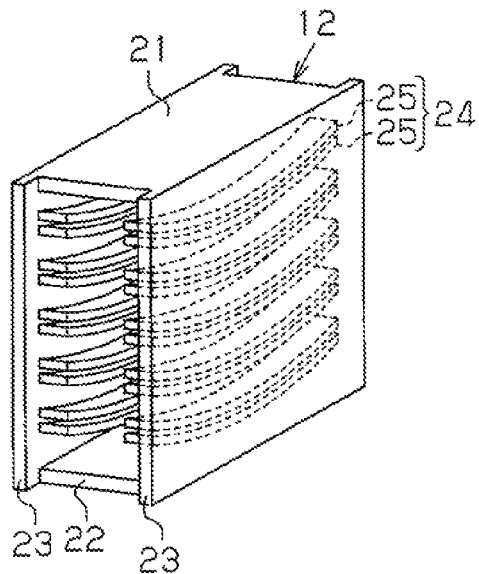
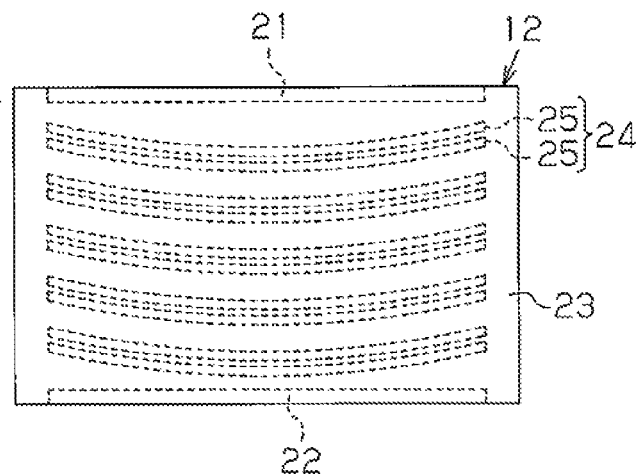
Fig.6A    Fig.6B
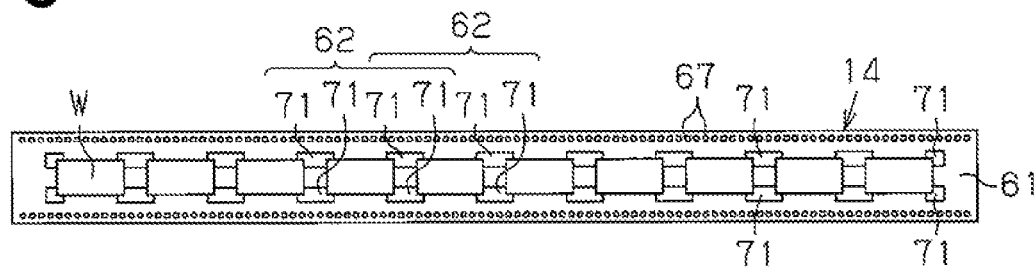
Fig.7A
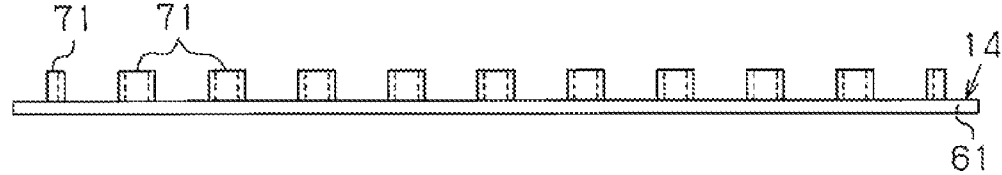
Fig.7B
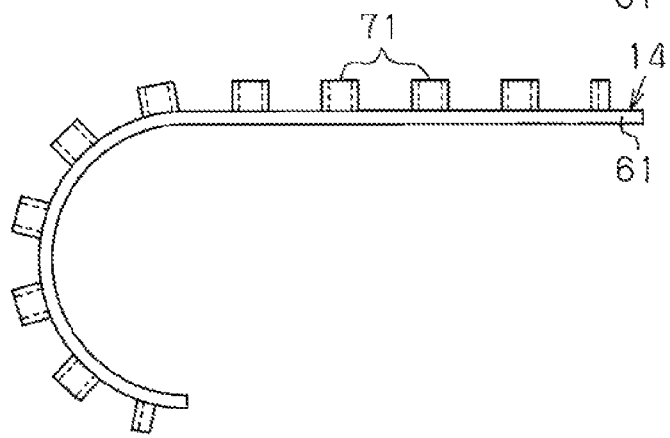
Fig.7C

WORKPIECE SUPPLYING APPARATUS AND WORKPIECE SUPPLYING METHOD

BACKGROUND OF THE INVENTION

The present invention relates to a workpiece supplying apparatus and a workpiece supplying method.

Japanese Laid-Open Patent Publication No. 2010-143685 describes a workpiece supplying apparatus including a plurality of carriers and a carrier case, which accommodates the carriers. Each carrier holds a plurality of workpieces such that the workpieces are arranged in a one-dimensional manner. Each carrier is drawn out from the carrier case by an unloading device at arranged intervals of the workpieces held by that carrier. The workpieces held by the carrier are sequentially unloaded from the carrier at a predetermined unloading position and arranged at a processing position on a workbench. The carrier from which the workpieces are unloaded is guided by roller-shaped inner guides. A transporting direction of the carrier is reversed by 180° as the carrier moves downward, and the carrier is accommodated in a collecting case. In such a workpiece supplying apparatus, workpieces are unloaded only at the unloading position. This allows for such equipment to be relatively compact.

However, the carrier of Japanese Laid-Open Patent Publication No. 2010-143685 has a front surface including a plurality of pockets that are arranged in a single row. Each pocket is shaped in correspondence with the outer shape of the workpieces. The pockets are recessed from the front surface of the carrier. The workpieces are accommodated and held in the pockets. This structure holds the workpieces in a preferable manner. However, the carrier has a rear surface including projections, which are formed in correspondence to the pockets. Thus, when the carrier is reversed, the pockets interfere with each other or with the inner guides. This hinders smooth transportation of the carrier.

Further, in such a workpiece supplying apparatus, it is necessary to arrange the carrier case, which accommodates the workpieces, at a position (unloading position) where the unloading device can unload the carriers. Thus, a tray changer may be arranged in the vicinity of the workbench. The A plurality of carrier cases accommodating workpieces is stacked onto the tray changer. The tray changer moves one of the carrier cases to the unloading position. Then, when unloading of the workpieces from the carrier case is completed, the tray changer moves an empty carrier case, which has no workpieces from the unloading position, and moves the next carrier case accommodating workpieces to the unloading position.

However, when there is a workbench for each processing operation, a tray changer, which is large, must be provided for every workbench. The workbench and the tray changer required for each processing operation increases the area occupied by the equipment.

Further, in the above publication, the carrier includes accommodation recesses (workpiece-receiving pockets), which receive workpieces. To prevent the workpiece from falling out of the accommodation recess of the carrier, a structure such as a cover tape has to be thermally welded to the front surface of the carrier to close the accommodation recesses. However, thermal welding of the cover tape would make it difficult to reuse the carrier and thereby raise costs.

SUMMARY OF THE INVENTION

It is a first object of the present invention to provide a workpiece supplying apparatus and a workpiece supplying method that smoothly transport carriers while holding workpieces in a preferable manner.

It is a second object of the invention to provide a workpiece supplying apparatus and a workpiece supplying method which can reduce the area occupied by the equipment.

It is a third object of the invention to provide a workpiece supplying apparatus and a workpiece supplying method that facilitates reuse of carriers while preventing workpieces from falling out of the carriers.

To achieve the first object, a first aspect of the present invention is a workpiece supplying apparatus including a plurality of flexible carriers, a carrier case, a drawing portion, a guide, and a collecting portion. Each of the carriers includes a base, which has a front surface and a rear surface, and a plurality of workpiece holding portions projecting from the front surface of the base. The workpiece holding portions are arranged in a one-dimensional manner and respectively hold workpieces. The carrier case accommodates the carriers. The drawing portion draws out each of the carriers from the carrier case along a drawing direction toward a workpiece unloading position. The guide guides each of the carriers drawn out by the drawing portion in a direction that differs from the drawing direction while bending the carrier so that the rear surface is arranged at an inner side. The collecting portion collects the carrier guided by the guide.

To achieve the first object, a second aspect of the present invention is a method for supplying workpieces. The method includes preparing a plurality of flexible carriers. Each of the carriers includes a base, which has a front surface and a rear surface, and a plurality of workpiece holding portions projecting from the front surface of the base, and the workpiece holding portions are arranged in a one-dimensional manner. The method also includes holding the workpieces respectively in the workpiece holding portions, accommodating the carriers in a carrier case, drawing each of the carriers from the carrier case toward a workpiece unloading position along a drawing direction, changing a direction of the drawn out carrier to a direction that differs from the drawing direction while bending the carrier so that the rear surface is arranged at an inner side, and collecting the carrier of which direction has been changed.

To achieve the second object, a third aspect of the present invention is a workpiece supplying apparatus including a plurality of flexible carriers, a plurality of carrier cases, a drawing portion, a guide, a collecting case, a collecting portion, a transportation unit, and a robot arm. Each of the carriers includes a base, which has a front surface and a rear surface, and a plurality of workpiece holding portions arranged on the front surface of the base. The workpiece holding portions are arranged in a one-dimensional manner and respectively hold workpieces. Each carrier case accommodates the carriers. The drawing portion draws out each of the carriers from each of the carrier cases along a drawing direction toward a workpiece unloading position. The guide is arranged on a workbench. The guide guides each of the carriers drawn out by the drawing portion in a direction that differs from the drawing direction while bending the carrier. The collecting case accommodates the carriers. The collecting portion sends each of the carrier guided by the guide into the collecting case. The transportation unit holds the carrier cases and transports the carrier cases to the vicinity of the workbench. The robot arm moves the carrier cases and the collecting case. The robot arm arranges the carrier case accommodating the workpieces of the carrier cases held by the transportation unit at a position corresponding to the guide, and the robot arm returns the collecting case to the transportation unit.

To achieve the second object, a fourth aspect of the present invention is a method for supplying workpieces. The method includes preparing a plurality of flexible carriers. Each of the carriers includes a base, which has a front surface and a rear surface, and a plurality of workpiece holding portions arranged on the front surface of the base. The workpiece holding portions are arranged in a one-dimensional manner. The method also includes holding the workpieces respectively in the workpiece holding portions, accommodating the carriers in carrier case, transporting the carrier cases accommodating the workpieces to the vicinity of a workbench with a transportation unit, moving the carrier cases from the transportation unit to the workbench with a robot arm, drawing each of the carriers from the carrier cases toward a workpiece unloading position along a drawing direction at the workbench, changing a direction of the drawn out carrier to a direction that differs from the drawing direction while bending the carrier, collecting the carrier of which direction has been changed in a collecting case, and returning the collecting case to the transportation unit with the robot arm.

To achieve the third object, a fifth aspect of the present invention is a workpiece supply apparatus including a flexible carrier. The carrier can accommodate a plurality of workpieces and carrier includes a base member and a holding member joined with the base member. The base member and the holding member are transported integrally. The base member includes a plurality of accommodation recesses arranged in a one-dimensional manner. The holding member includes a plurality of workpiece holding portions. Each of the workpiece holding portions is located in a corresponding one of the accommodation recesses and holds a corresponding one of the workpieces.

To achieve the object, a sixth aspect of the present invention is a method for supplying workpieces. The method includes moving a carrier toward a workpiece unloading position. The carrier accommodates a plurality of workpieces. The method also includes sequentially unloading the workpieces at the workpiece unloading position. The carrier includes a base member and a holding member. The base member includes a plurality of accommodation recesses arranged in a one-dimensional manner. The holding member includes a plurality of workpiece holding portions respectively arranged in the accommodation recesses. The moving of the carrier toward the workpiece unloading position includes integrally moving the base member and the holding member in a state in which the base member and the holding member are superposed with each other.

BRIEF DESCRIPTION OF THE DRAWINGS

The invention, together with objects and advantages thereof, may best be understood by reference to the following description of the presently preferred embodiments together with the accompanying drawings in which:

FIG. 1A is a schematic perspective view showing a workpiece supplying apparatus according to a first embodiment of the present invention;

FIG. 1B is a cross-sectional view taken along line I-I in FIG. 1A showing the shape of a guide groove in a reversal guide;

FIG. 2 is a cross-sectional view taken along line II-II in FIG. 1A;

FIG. 4A is a plan view of a carrier shown in FIG. 2;

FIG. 4B is a front view of the carrier shown in FIG. 4A;

FIG. 4C is a perspective view of a main part of the carrier shown in FIG. 4A;

FIG. 4D is a perspective view of the carrier shown in FIG. 4A when workpieces are drawn out;

FIGS. 5A to 5L are schematic diagrams showing the operation of the workpiece supplying apparatus when workpieces are drawn out;

FIG. 6A is a perspective view of a carrier case according to a second embodiment of the invention;

FIG. 6B is a front view of the carrier case shown in FIG. 6A;

FIG. 7A is a plan view of the carrier in the second embodiment;

FIG. 7B is a front view of the carrier shown in FIG. 6A;

FIG. 7C is a side view of the carrier shown in FIG. 6A when workpieces are unloaded;

DETAILED DESCRIPTION OF PREFERRED EMBODIMENTS

First Embodiment

Figure 3A:
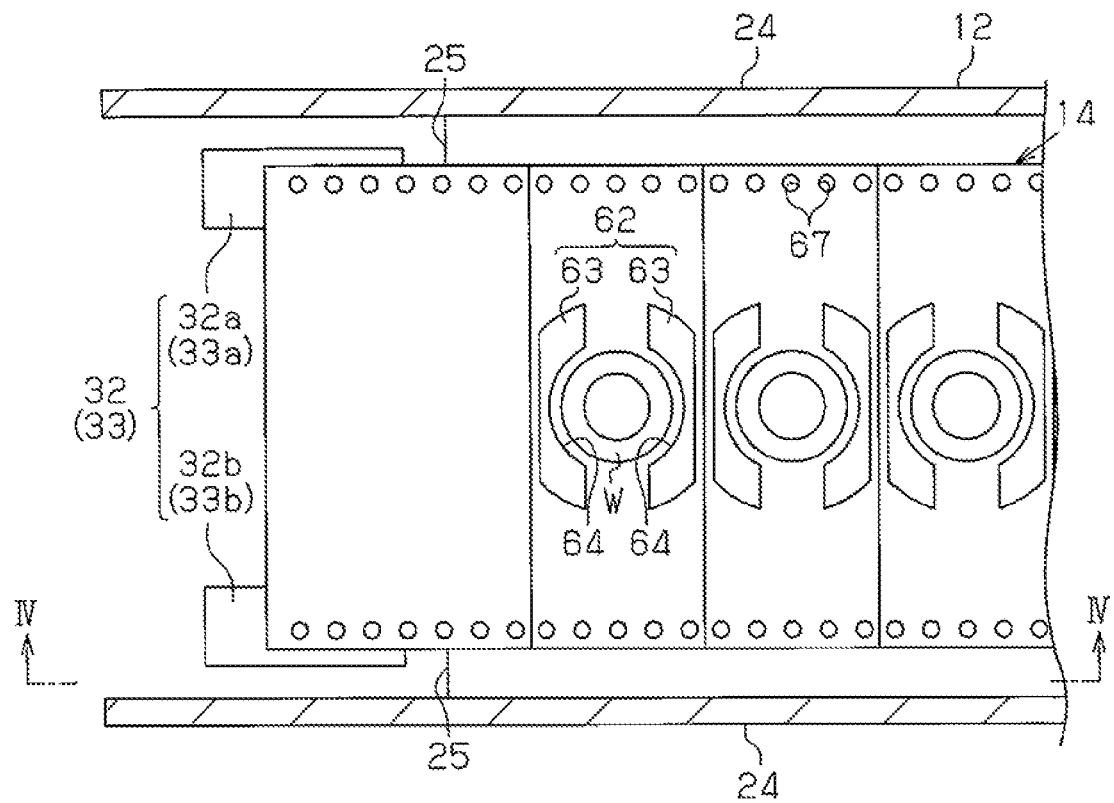
FIG. 3A is a cross-sectional view taken along line III-III in FIG. 2.

A first embodiment of the present invention will now be described in accordance with FIGS. 1A to 5L.

Entire Structure of Workpiece Supplying Apparatus

As shown in FIG. 1A, a workpiece supplying apparatus 11 includes two vertically arranged carrier cases 12 and a transporting mechanism 13 arranged beside the carrier cases 12. The two carrier cases 12 are independently moved up and down by a lifting mechanism (not shown). Flexible carriers 14 shown in FIG. 4A are accommodated in the upper one of the carrier cases 12. The carriers 14 are loaded in a state separated from one another in the vertical direction. The carriers 14 accommodated in the upper carrier case 12 are sequentially drawn out by the transporting mechanism 13, and the drawn out carriers 14 are gradually reversed and sequentially accommodated in the lower carrier case 12.

Carrier Case

Each of the carrier cases 12 is box-shaped and hollow. As shown in FIG. 2, the carrier case 12 includes a top wall 21, a bottom wall 22, and two side walls 23, which connect the top wall 21 and the bottom wall 22. Front and rear walls of the carrier case 12 are omitted. The top wall 21 and the bottom wall 22 of the carrier case 12 are shorter in length in their longitudinal directions than the two side walls 23. Supports 24 are provided on an inner surface of each of the two side walls 23. The supports 24 are arranged at fixed intervals on each side wall 23 in the vertical direction. The supports 24 of the two side walls 23 are opposed to each other in the lateral direction. The lateral direction intersects with the vertical direction and the longitudinal direction at right angles. Each support 24 includes two crosspieces 25, which are separated from each other in the vertical direction. Each crosspiece 25 extends in the longitudinal direction. The length of the crosspieces 25 in the longitudinal direction is about the same as the length of the top wall 21 and the bottom wall 22. Two sets of crosspieces 25 opposed to each other in the lateral direction support a belt-shaped carrier 14. That is, two side edges (edge portions) of a carrier 14 extending along the longitudinal direction are arranged between a set of two crosspieces 25 on one of the side walls 23 and between a set of two crosspieces 25 on the other side wall 23. The carrier 14 will be described in detail later.

Practically, the upper and lower carrier cases 12 are separated from each other so that they do not interfere with each other even when they are independently moved up and down. A reversal guide 31 has a size adjusted in accordance with the distance degree between the upper and lower carrier cases 12 or the size of the carrier cases 12.

Transporting Mechanism

As shown in FIG. 2, the transporting mechanism 13 includes the reversal guide 31 and first and second gear pairs 32 and 33.

Reversal Guide

The reversal guide 31, which serves as a guide, is arranged in correspondence with a boundary between the two upper and lower carrier cases 12. The reversal guide 31 is formed into a semi-cylindrical and includes an upper surface 31$a$, a lower surface 31$b$, an arc surface 31$c$, and a chord surface 31$d$. The upper surface 31$a$, the arc surface 31$c$, and the lower surface 31$b$ function as a guide surface 41 for the carrier 14. The chord surface 31$d$ faces the carrier case 12. As shown in FIG. 1A, two protrusions 42 are formed on the guide surface 41 of the reversal guide 31. The protrusions 42 extend respectively along the left and right side edges of the guide surface 41. As shown in FIG. 1B, guide grooves 43 are formed between the protrusions 42 and the guide surface 41. The two guide grooves 43 are opposed to each other in the lateral direction. The two side edges of a carrier 14 are arranged between the guide grooves 43.

The upper surface 31$a$ and the lower surface 31$b$ of the reversal guide 31 correspond to the supports 24 at corresponding levels in the upper and lower carrier cases 12. For example, as shown in FIG. 2, when the upper surface 31$a$ corresponds to the support 24 at the second level from the bottom of the upper carrier case 12, the lower surface 31$b$ corresponds to the support 24 at the second level from the bottom of the lower carrier case 12. When the upper surface 31$a$ is arranged in correspondence with a support 24 of the upper carrier case 12, a carrier 14 is drawn out from the upper carrier case 12 and smoothly transferred to the upper surface 31$a$. The carrier 14 drawn out from the upper carrier case 12 moves along the guide surface 41 in a state in which the two side edges of the carrier 14 are guided by the two guide grooves 43. Then, the carrier 14 is reversed as it moves downward along the guide surface 41. When the lower surface 31$b$ is arranged in correspondence with a lower support 24, the carrier 14 guided by the two guide grooves 43 is smoothly transferred to the support 24 of the lower carrier case 12 and then accommodated in the carrier case 12. The size of the reversal guide 31 is adjusted in accordance with the distance degree between the upper and lower carrier cases 12 or the size of the carrier cases 12.

Transporting Gear

As shown in FIG. 2, the first gear pair 32, which serves as a drawing portion, and the second gear pair 33, which serves as a transferring portion, are arranged opposing the chord surface 31$d$. The first gear pair 32 is opposed to an upper portion of the chord surface 31$d$, and the second gear pair 33 is opposed to a lower portion of the chord surface 31$d$. The first and second gear pairs 32 and 33 are supported by a support mechanism (not shown) so that the pairs 32 and 33 are accommodated in the two carrier cases 12. The first and second gear pairs 32 and 33 are accommodated in front portions of the carrier cases 12 where the supports 24 are not present in the vertical direction. Hence, even when the two carrier cases 12 move vertically, the first and second gear pairs 32 and 33 do not interfere with the supports 24. The first and second gear pairs 32 and 33 move up and down relative to the two carrier cases 12.

Figure 3B:
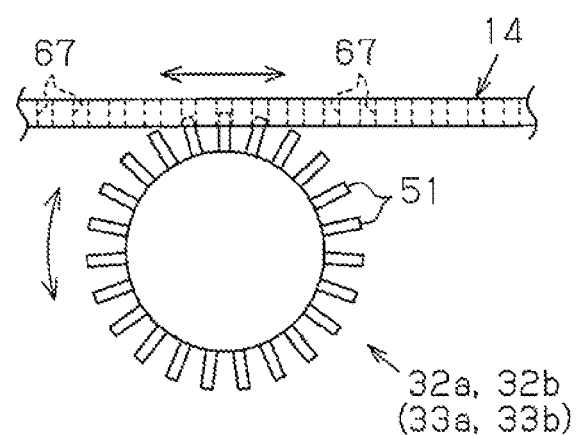
FIG. 3B is a cross-sectional view taken along line IV-IV in FIG. 3A.

As shown in FIG. 3A, the first gear pair 32 includes two gears 32$a$ and 32$b$. The two gears 32$a$ and 32$b$ are arranged near the two side walls 23. As shown in FIG. 3B, rod-shaped (nail-shaped) teeth 51 are formed on the circumferential surfaces of the two gears 32$a$ and 32$b$. The two gears 32$a$ and 32$b$ are rotated by driving a driving source such as a motor (not shown). The second gear pair 33 also includes two gears 33$a$ and 33$b$. The layout and the like of the gears 33$a$ and 33$b$ are the same as the first gear pair 32. Thus, the elements of the second gear pair 33 will not be described but are indicated by the reference characters shown in parentheses together with the elements of the first gear pair 32.

Carrier

Referring to FIGS. 4A and 4B, the carrier 14 is formed integrally from a synthetic resin such as polypropylene. The carrier 14 includes a rectangular plate-shaped base 61 and a plurality of holding portions 62 arranged on a surface of the base 61. The holding portions 62 function as workpiece holding portions. The holding portions 62 are arranged in a one-dimensional manner (straight) at fixed intervals. Each holding portion 62 holds a workpiece W, which is a part fed to an assembly line (not shown). One example of a workpiece W is a bearing used for a motor.

Each holding portion 62 includes a set of two holding walls 63. The holding walls 63 are shaped in correspondence with the outer shape of the workpiece W. The two holding walls 63 are opposed to each other in the longitudinal direction of the base 61. Concave surfaces 64 corresponding to the outer shape of the workpiece W (here, bearing) are formed on the inner surfaces of the opposing holding walls 63.

The base 61 includes two ends defining a starting end 65 and a terminating end 66 that do not include the holding portions 62. A large number of holes 67 are formed in the side edges of the base 61. The holes 67 are arranged along a line at fixed intervals along a longitudinal direction of the base 61. As shown in FIG. 3B, the teeth 51 of the two gears 32*a* and 32*b* and the two gears 33*a* and 33*b* are inserted into the holes 67 from below (from the rear surface of carrier 14). When the two gears 32*a* and 32*b* or the two gears 33*a* and 33*b* rotate, the carrier 14 is moved in the longitudinal direction. As shown in the enlarged portion encircled at the lower right section of FIG. 4B, grooves 68 are formed in a surface of the base 61 between the holding portions 62. The grooves 68 extend in a direction perpendicular to a transporting direction of the carrier 14. The grooves 68 allow the carrier 14 to easily bend so that the surface opposite to the holding portions 62 remains at the inner side.

When the carrier 14 is accommodated in the carrier case 12, the carrier 14 is maintained in a flat state as shown in FIG. 4C. When the carrier 14 is drawn out from the carrier case 12 and guided by the reversal guide 31, the carrier 14 is bent so that the surface of the carrier 14 opposite to the holding portions 62 remains at the inner side as shown in FIG. 4D.

Workpiece Supplying Procedures

The procedures for supplying workpieces with the workpiece supplying apparatus 11 will be described with reference to FIGS. 5A to 5L. The upper carrier case 12 holds a plurality of carriers 14. A workpiece W is held in each holding portion 62 of each carrier 14. The two gears 32*a* and 32*b* are maintained in a state engaged with the holes 67 of the starting end 65 in the lowermost carrier 14. Four carriers 14 are accommodated in the upper carrier case 12.

When the supplying of the workpiece W is started, a driving source is activated to rotate the first and second gear pairs 32 and 33 in a counterclockwise direction. As shown in FIG. 5A, among the carriers 14 accommodated in the upper carrier case 12, the lowermost carrier 14 is moved forward (leftward in FIG. 5A). The carrier 14 is straightly drawn out by the engagement of the holes 67 with the first gear pair 32.

Next, when a workpiece W held by the carrier 14 reaches an unloading position, the workpiece W is unloaded from the holding portion 62 by an unloading mechanism (not shown). In this embodiment, the workpiece W that reaches the unloading position is first unloaded upward as shown by arrow A1 in FIG. 5A. Next, the workpiece W is moved toward an assembly line located in front of the workpiece supplying apparatus 11 as shown by arrow A2. As shown by arrow A3 in FIG. 5A, the workpiece W is then moved downward and fed to the assembly line. The unloading operation of the workpiece W is carried out whenever a workpiece W reaches the unloading position. The unloading position is set at a boundary between the upper surface 31*a* and the arc surface 31*c* of the reversal guide 31, more specifically, a position immediately before the upper surface 31*a* changes to the arc surface 31*c*.

As shown in FIG. 5B, the carrier 14 drawn out from the upper carrier case 12 moves onto the guide surface 41 in a state in which the two side edges of the carrier 14 are guided by the two guide grooves 43, and the carrier 14 is reversed as it moves downward along the guide surface 41. When the terminating end 66 of the carrier 14 is disengaged from the first gear pair 32, the engagement between the starting end 65 of the carrier 14 and the second gear pair 33 is started. The carrier 14 reversed by the reversal guide 31 is moves rearward toward the lower carrier case 12 by the second gear pair 33.

As shown in FIG. 5C, when the terminating end 66 of the first carrier 14 is completely drawn out from the upper carrier case 12, the upper carrier case 12 is lowered by one level, that is, the upper carrier case 12 is lowered by a distance substantially equal to the interval between the supports 24 in the vertical direction. Then, the holes 67 of the starting end 65 in the second carrier 14 are engaged with the teeth of the first gear pair 32. That is, the second carrier 14 can be drawn out by the rotation of the first gear pair 32.

As shown in FIG. 5D, the forward unloading operation of the second carrier 14, which has reached the lowermost level, is started. Further, the first carrier 14 that was first drawn out and is now empty is continuously moved rearward. The first carrier 14 of which transporting direction has been reversed by 180° by the reversal guide 31 will soon be accommodated in the lower carrier case 12 in a reversed state as shown in FIG. 5E.

As shown in FIG. 5F, the first carrier 14 is accommodated in the lower carrier case 12. When the second carrier 14 is drawn out from the upper carrier case 12, the upper and lower carrier cases 12 are lowered by one level.

As shown in FIG. 5G, the forward unloading operation of the third carrier 14, which has reached the lowermost level, is started. Further, the second carrier 14 that was previously drawn out and is not empty is continuously moved rearward. The second carrier 14 of which transporting direction has been reversed by 180° by the reversal guide 31 is accommodated in the lower carrier case 12 in a reversed state as shown in FIG. 5H. This second carrier 14 is accommodated in the lower carrier case 12 and located above the first carrier 14.

In the same manner, as shown in FIG. 5I, the upper and lower carrier cases 12 are lowered by one level. As shown in FIG. 5J, the forward unloading operation of the fourth carrier 14, which has reached the lowermost level, is started. The third carrier 14, which has been reversed, is gradually accommodated in the lower carrier case 12. The third carrier 14 will soon completely be accommodated in the lower carrier case 12 as shown in FIG. 5K. In this state, the forward unloading operation of the remaining fourth carrier 14 is continued. Then, when the workpieces W held by the fourth carrier 14 are all unloaded as show in FIG. 5L, the supplying of the workpieces W, which have been accommodated in the upper carrier case 12 with the carriers 14, to the assembly line is completed.

Subsequently, the lower carrier case 12 accommodating empty carriers 14 is accommodated is moved to a workpiece replenishing station (not shown). After the carrier case is replenished with workpieces W at the workpiece replenishing station, a carrier case 12 replenished with the workpieces W returns to an upper stage of the workpiece supplying apparatus 11, and the workpieces W are drawn out again. The upper carrier case 12 that becomes empty moves to a lower stage to receive the empty carriers 14 drawn out from the newly set upper carrier case 12.

Advantages of First Embodiment

The first embodiment has the advantages described below.

(1) The holding portions 62 project from the front surface of the carrier 14, and the rear surface of the carrier 14, which is opposite to the holding portion 62, is flat. The reversal guide 31 guides the carrier 14 drawn out by the first gear pair 32 in a direction that differs from the drawing direction Y of the first gear pair 32 by bending the carrier 14 so that its rear surface faces an inward side. Hence, the carriers 14 do not interfere with each other even when the carriers 14 are reversed. In other words, unlike a structure in which the carrier 14 is bent and guided so that its front surface, which is the side of the holding portion 62, faces the inward side, interference between the holding portions 62 and between the holding portion 62 and the reversal guide 31 is suppressed. Further, since the rear surface of the carrier 14 does not include convex portions or concave portions, the carrier 14 is guided while smoothly moving on the guide surface 41 of the reversal guide 31. This smoothly conveys the carrier 14 while holding the workpiece W in a preferable manner. Thus, the workpieces W are smoothly and readily fed (unloaded).

(2) A carrier 14 drawn out from the upper carrier case 12 is guided by the reversal guide 31 in a direction opposite to the unloading device and collected in the lower carrier case 12. For example, when the carrier 14 is collected in the drawing direction, space for collecting the carrier 14 is necessary in the drawing direction. Since the assembly line is often located toward the drawing direction of workpieces W, it is difficult to provide such collecting space. However, when the carrier 14 is carried in the direction opposite to the drawing direction for collection, there is not need for collection space in the drawing direction. Accordingly, collection space for the carrier 14 can be easily obtained.

(3) Each workpiece W is held by the two adjacent holding walls 63 spaced apart from each other in the longitudinal direction of the carrier 14. Thus, at least parts (held portions) of the workpiece W located at opposite sides in the drawing direction of the carrier 14 are surrounded by the holding walls 63. This prevents the workpiece W from falling out from the holding portion 62 when the carrier 14 is drawn out. Further, the workpiece W can easily be picked through a gap formed between the two holding walls 63. This facilitates the unloading of the workpiece W and the loading of the workpiece W between the two holding walls 63.

(4) The workpieces W are arranged along a line in the drawing direction Y in the carrier case 12. This suppresses enlargement of the carrier 14 holding the workpieces W, the carrier case 12 accommodating the carriers 14, and a workbench S in the lateral direction, which is perpendicular to the drawing direction Y.

(5) A collecting means includes the second gear pair 33, which serves as a transferring portion that transfers a carrier 14 guided by the reversal guide 31 toward the lower carrier case 12 (collecting case). In this structure, the carrier 14, which is guided by the reversal guide 31, is transferred to the lower carrier case 12 by the second gear pair 33. This smoothly collects the carriers 14.

(6) The carrier case 12 is used as the collecting case. This suppresses an increase in the number of parts.

Second Embodiment

A second embodiment of the present invention will now be described. In this example, the holding portions of the carrier 14 and the carrier case 12 different from the first embodiment. Like or same reference numerals are given to those components that are the same as the corresponding components of the first embodiment. Such components will not be described in detail.

Figure 9:
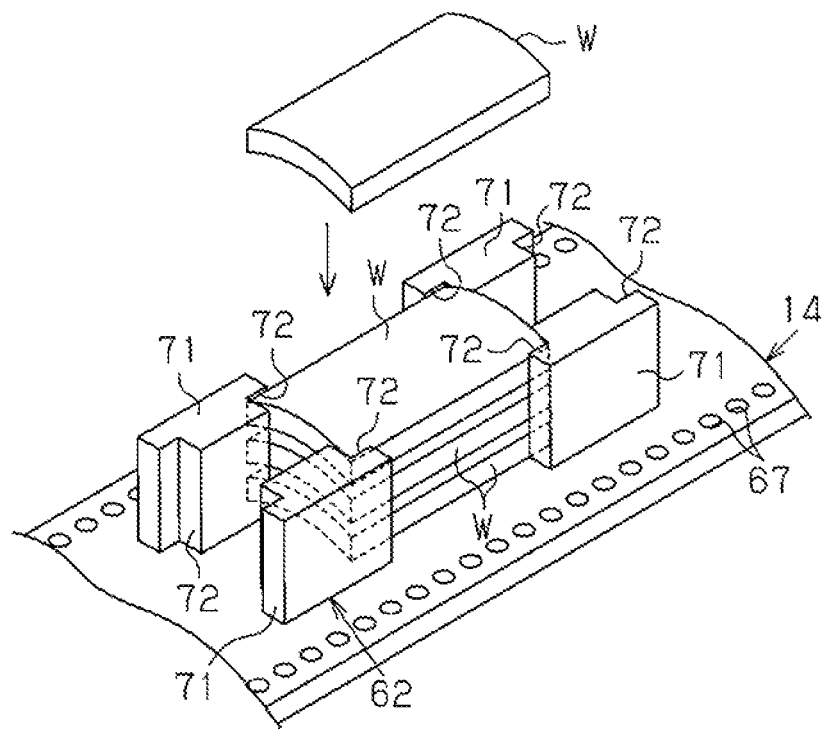
FIG. 9 is a perspective view of the main part of the carrier shown in FIG. 6A in a state in which the carrier holds the workpieces.

As shown in FIGS. 6A and 6B, the crosspieces 25 of the carrier case 12 are slightly curved downward into a convex shape. As shown in FIG. 9, each workpiece W of this embodiment is a permanent magnet used for a rotor of a motor. The permanent magnet is slightly curved upward into a convex shape as viewed in the drawing. The holding portions 62 hold a plurality of workpieces W in a stacked state.

Each holding portion 62 includes four holding walls 71. Each holding walls 71 includes steps 72 formed in correspondence with the outer shape of corners in a set of stacked workpieces W. The step 72 is formed over the entire vertical length of the holding wall 71. The step 72 has two flat surfaces which are perpendicular to each other. Four angle corners (held portions) of the set of workpieces W are held in a state surrounded by the steps 72 of the four holding walls 71.

Two steps 72 are formed on each holding wall 71. The steps 72 are located on opposite sides of the holding wall in the longitudinal direction of the carrier 14. That is, two sets of workpieces W that are adjacent to each other in the longitudinal direction of the carrier 14 are held by two holding walls 71 that are shared by and arranged between the two sets of workpieces W. As shown in FIGS. 7A and 7B, one of the steps 72 is formed on each of the top holding wall 71 and the last holding wall 71 of the carrier 14. The top and last holding walls 71 only hold a group of top workpieces W and a group of last workpieces W, respectively. As shown in FIG. 7C, the carrier 14 of this embodiment is also bent into an arc shape, and the surface opposite to the holding portion 62 (holding wall 71) defines an inner side.

Figure 8:
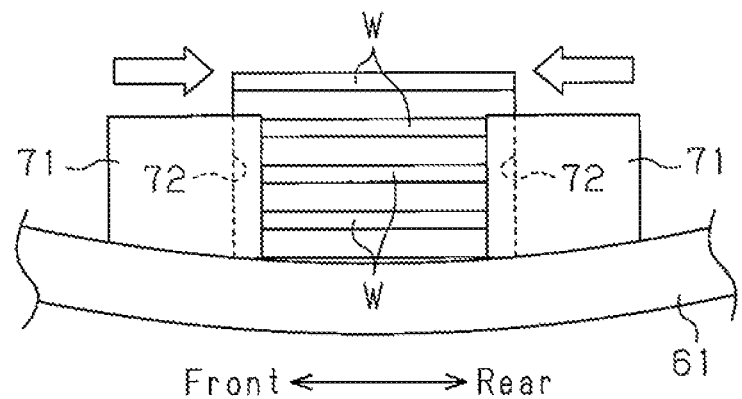
FIG. 8 is a front view of the main part of the carrier shown in FIG. 6A in a state in which the carrier holds the workpieces.

The carrier 14 (specifically, the base 61) arranged between a set of crosspieces 25 is held in a state in which the carrier 14 is slightly curved downward along the crosspieces 25. As a result, as shown in FIG. 8, distal portions of two sets of two holding walls 71 (four in total) which are adjacent to each other in the longitudinal direction of the carrier 14, are moved toward each other. The distance between the distal portions of the two sets of holding walls 71 is shortened in accordance with a curving degree of the base 61. As a result, one set of workpieces W is sandwiched and held between the two sets of holding walls 71, which are adjacent to each other in the longitudinal direction of the carrier 14. Accordingly, the carrier 14 is stably accommodated in the carrier case 12. Further, the components accommodated in the carrier 14 are not displaced when the carrier case 12 is transported.

In this embodiment, the upper one of the crosspieces 25 in each set may be omitted. In such a case, the carrier 14 held on the upper surface of the lower stage crosspiece 25 is deformed downward by the weight of the workpieces W, and the carrier 14 is maintained in a state in which it is deformed along a curve of the lower stage crosspiece 25. IN this case, the carrier 14 holding workpieces W is also stably accommodated in the carrier case 12. The unloading and collecting procedures of the carriers 14 are the same as the first embodiment.

Advantages of Second Embodiment

The second embodiment has the following advantage in addition to advantages (1) to (3) of the first embodiment.

(7) The carrier 14, which holds the workpieces W, is accommodated in the carrier case 12 in a state in which the carrier 14 is deformed downward into a convex shape. Thus, each of the carriers 14 is stably accommodated in the carrier case 12. Further, the components accommodated in the carrier 14 are not displaced when the carrier case 12 is transported. Moreover, when the carrier 14 is drawn out from the carrier case 12, the workpieces W are stably held by the carrier 14. This prevents the workpieces W from falling out of the carrier 14.

Third Embodiment

A third embodiment of the present invention will now be described with reference to FIG. 14. Components that are the same as the corresponding components of the first and second embodiments will not be described in detail.

Entire Structure of Workpiece Supplying Apparatus

Figure 14:
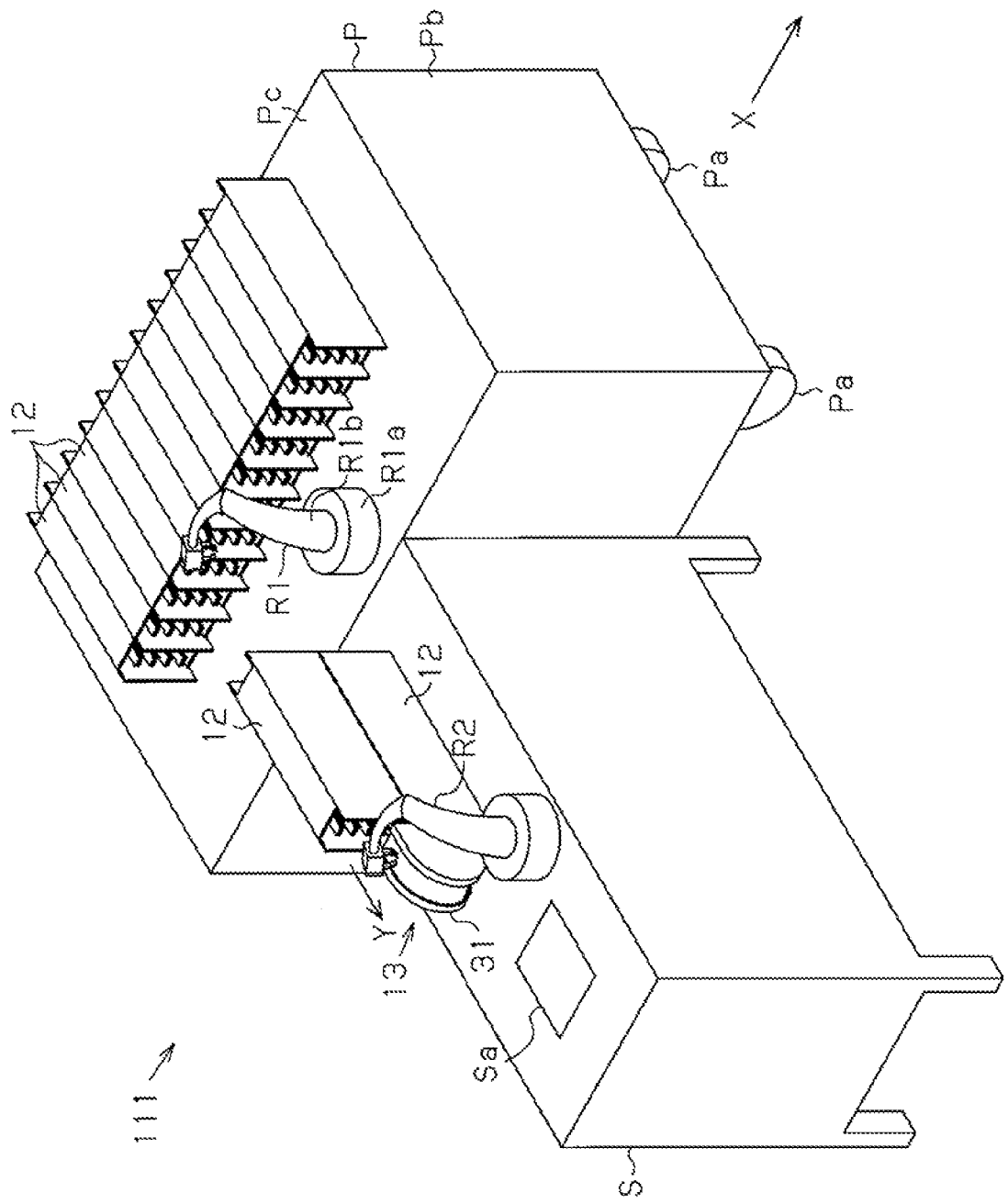
FIG. 14 is a schematic perspective view showing a workpiece supplying apparatus according to a third embodiment of the invention.

As shown in FIG. 14, a workpiece supplying apparatus 111 of the third embodiment sequentially feeds a plurality of workpieces W to a working position Sa on a workbench S. The workpiece supplying apparatus 111 includes an automatic transportation vehicle P that transports a plurality of carrier cases 12 (stick trays) accommodating workpieces W to a location in the vicinity of the workbench S. A transporting mechanism 13 fixed to the workbench S. The workbench S is provided for each of a plurality of processing operations, and the automatic transportation vehicle P carries the carrier case 12 to each workbench S.

The automatic transportation vehicle P includes a platform Pb supported by a plurality of wheels Pa, and the carrier cases 12 are arranged on a holding surface Pc defined on an upper portion of the platform Pb so that the carrier cases 12 are arranged in a transporting direction X (traveling direction) of the automatic transportation vehicle P. A case-moving robot arm R1 that can hold the carrier case 12 is arranged on the holding surface Pc of the automatic transportation vehicle P. The robot arm R1 includes a base portion R1a, which is fixed to the holding surface Pc, and an arm portion R1b, which extends from the base portion R1a. The robot arm R1 expands and contracts the arm portion R1b so that the arm portion R1b can reach the two opposite side ends of the carrier cases 12 arranged in the transporting direction X.

The transporting mechanism 13 and a workpiece unloading robot arm R2, which unloads the workpieces W are arranged on the workbench S. Two carrier cases 12 are supported on the workbench S by a support (not shown) at one side of the transporting mechanism 13 (side facing a stop position of the automatic transportation vehicle P) so that the carrier cases 12 are arranged in the vertical direction. As shown in FIG. 1A, a lower one of the two carrier cases 12, which are arranged in the vertical direction, is used as a collecting case. A plurality of flexible carriers 14 and a plurality of workpieces W held by the carriers 14 are accommodated in the upper carrier case 12.

The carriers 14 accommodated in the upper carrier case 12 are sequentially drawn out in the drawing direction Y (direction perpendicular to the transporting direction X of automatic transportation vehicle P) by the transporting mechanism 13, and the workpieces W held by each carrier 14 is unloaded by the robot arm R2. The drawn out carriers 14 are gradually reversed and sequentially accommodated in the lower carrier case 12. The upper carrier case 12 is arranged at an unloading position (guide position) where a carrier 14 can be drawn out by the transporting mechanism 13, and the lower carrier case 12 is arranged at a position where a carrier 14 from which workpieces W have been unloaded can be collected. The case-moving robot arm R1 moves a carrier case 12 from the holding surface Pc of the automatic transportation vehicle P to an unloading position, and the case-moving robot arm R1 moves a carrier case 12 from a collecting position to the holding surface Pc of the automatic transportation vehicle P.

Workpiece Supplying Procedures

Next, a method for supplying workpieces with the workpiece supplying apparatus 111 will be described.

First, the automatic transportation vehicle P stops in the vicinity of the workbench S. On the automatic transportation vehicle P, carrier cases 12, each including four carriers 14 accommodating workpieces W with the holding portions 62, are held on the holding surface Pc. A carrier case 12 (collecting case) that does not include any carriers 14 is arranged at the collecting position on the workbench S. The automatic transportation vehicle P is controlled by a control unit (not shown), and the automatic transportation vehicle P automatically travels to the workbench S from a loading station where carrier cases 12 including workpiece are received.

Next, one of the carrier cases 12 (e.g., carrier case 12 located at one end) on the holding surface Pc of the automatic transportation vehicle P is grasped by the case-moving robot arm R1 and moved to the unloading position on the workbench S. This stacks the carrier cases 12 in the vertical direction on the workbench S as shown in FIGS. 1A and 2. In this state, in the upper carrier case 12 (carrier case 12 disposed at the unloading position), the holes 67 at the starting end 65 in the lower carrier 14 remain engaged with and the two gears 32a and 32b (see FIGS. 3A and 3B).

Next, a carrier 14 is drawn out from the upper carrier case 12.

Next, when the workpieces W held by the carrier 14 reach the unloading position, the workpieces W are unloaded from the holding portions 62 by the workpiece unloading robot arm R2 (see FIG. 14). In this embodiment, a workpiece W that reaches the unloading position is first unloaded upward by the robot arm R2 as shown by the arrow A1 in FIG. 5A. Next, the workpiece W is moved toward the working position Sa (see FIG. 14) located in front of the workpiece supplying apparatus 111 as shown by the arrow A2. Then, as show by the arrow A3 in FIG. 5A, the workpiece W is moved downward and fed to the working position Sa.

Thereafter, the same operations as those shown in FIGS. 5B to 5L of the first embodiment are carried out.

Then, the lower carrier case 12 that receives empty carriers 14 is moved to the holding surface Pc on the automatic transportation vehicle P by the case-moving robot arm R1. Then, the upper carrier case 12 (carrier case 12 located at the unloading position) from which all of the carriers 14 have been drawn out is moved to the lower collecting position by the robot arm R1. Further, one of the carrier cases 12, which accommodates the workpieces W, on the holding surface Pc of the automatic transportation vehicle P is moved to the upper unloading position by the robot arm R1. The above-described unloading steps of the workpieces W is repeated a predetermined number of times. The automatic transportation vehicle P counts the number of carrier cases 12 accommodating workpieces that are moved from the holding surface Pc to the workbench S. When the number reaches a predetermined number, the automatic transportation vehicle P automatically moves to the next workbench or the loading station.

Advantages of Third Embodiment

The third embodiment has the following advantages in addition to advantages (1) to (6) of the first embodiment.

(8) The workpiece supplying apparatus 111 of the third embodiment includes the automatic transportation vehicle P, which serves as a transportation unit, and the robot arm R1. A plurality of carrier cases 12 can be held on the automatic transportation vehicle P, and the automatic transportation vehicle P carries a plurality of carrier cases 12 to a location in the vicinity of the workbench S where the reversal guide 31 is arranged. The robot arm R1 transfers one of the carrier cases 12 accommodating workpieces W on the automatic transportation vehicle P to a position corresponding to the reversal guide 31, that is, position (unloading position) where the reversal guide 31 can guide the carrier 14. Further, the robot arm R1 returns, to the automatic transportation vehicle P, a collecting case (lower carrier case 12) accommodating carriers 14 from which workpieces W have been unloaded. In this manner, the robot arm R1 is used to exchange carrier cases 12. Thus, the area occupied by the equipment is small as compared with when a tray changer that is apt to being larger than the robot arm R1 is used. Further, the robot arm R1 transfers carrier cases 12 accommodating workpieces from the automatic transportation vehicle P and returns carrier cases 12 as collecting cases to the automatic transportation vehicle P. This allows for automation of the production line.

(9) The transportation unit is the automatic transportation vehicle P, and the automatic transportation vehicle P includes the case-moving robot arm R1. Thus, there is no need to provide a robot arm R1 for each workbench S. This suppresses an increase in the number of robot arms R1 and reduces costs.

Fourth Embodiment

A fourth embodiment of the present invention will now be described with reference to FIGS. 15 to 21. In the fourth embodiment, a reversal guide 231 and carriers 214 differ from those of the first to third embodiments. Components that are the same as the corresponding components of the first to third embodiments will not be described in detail.

Entire Structure of Workpiece Supplying Apparatus

Figure 15:
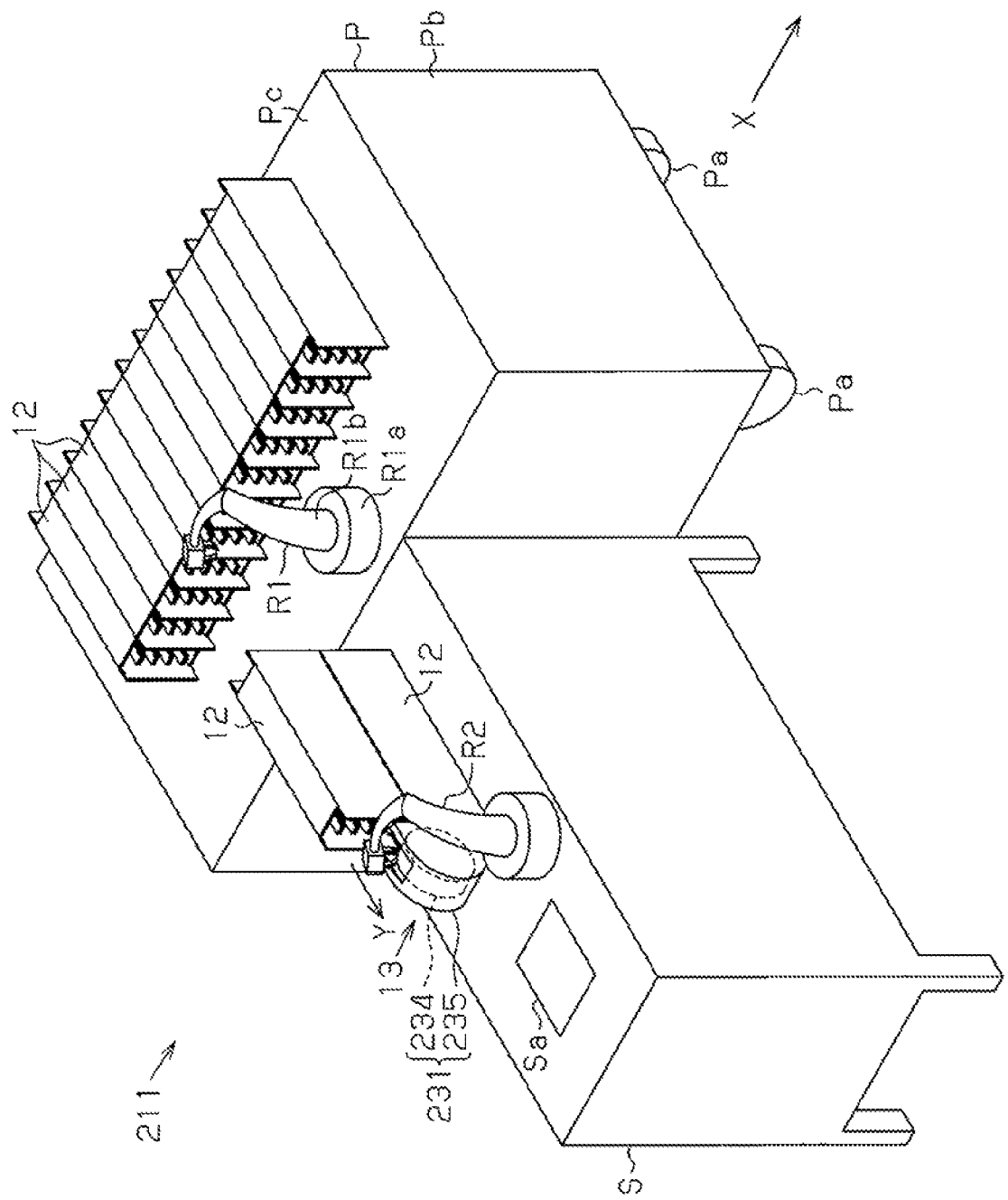
FIG. 15 is a schematic perspective view showing a workpiece supplying apparatus according to a fourth embodiment of the invention.

As shown in FIG. 15, a workpiece supplying apparatus 211 of the fourth embodiment sequentially feed a plurality of workpieces W to a working position Sa at a workbench S like the workpiece supplying apparatus 111 (see FIG. 14) of the third embodiment.

Reversal Guide

Figure 16:
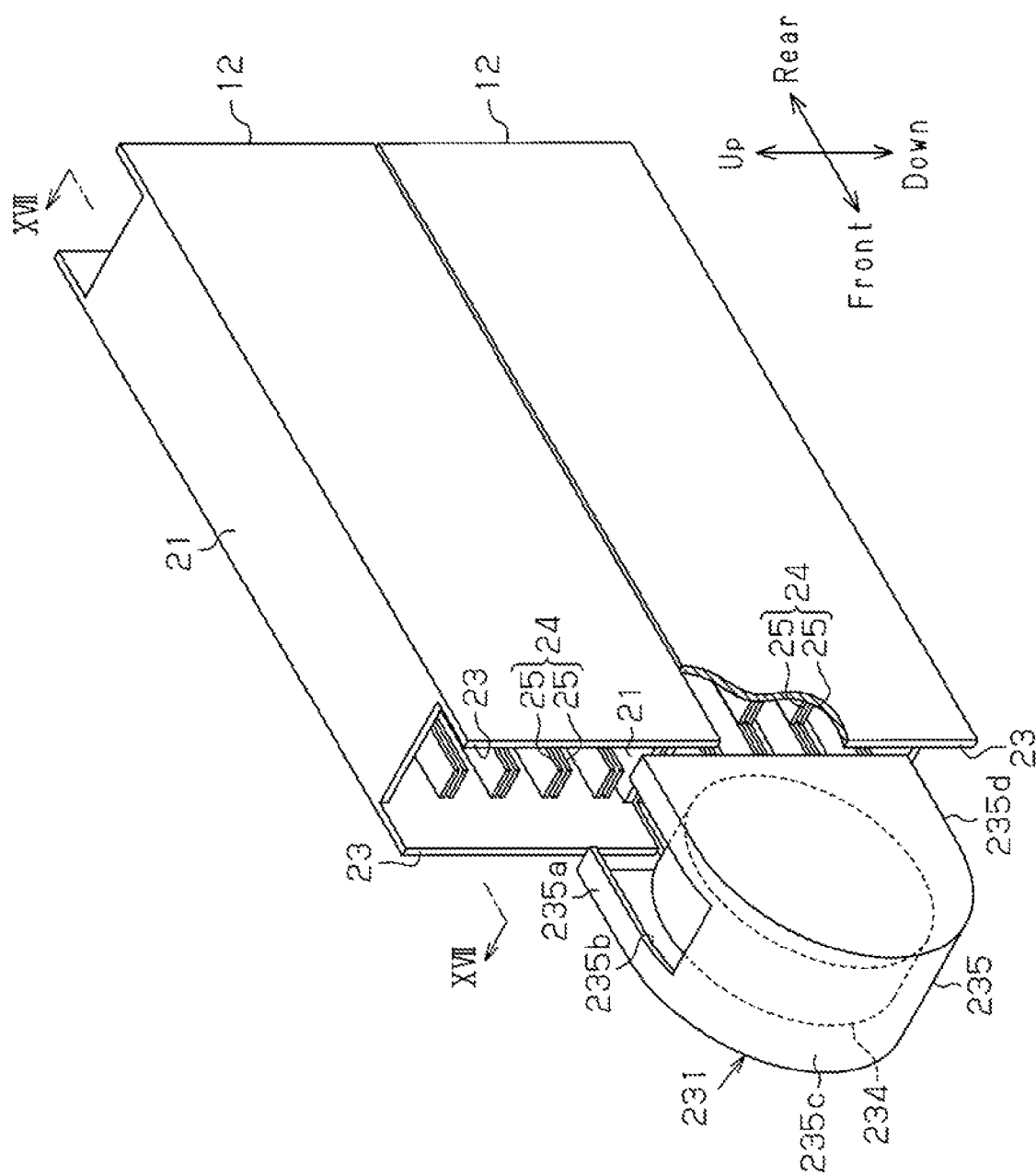
FIG. 16 is a schematic perspective view of part of the workpiece supplying apparatus shown in FIG. 15.
Figure 17:
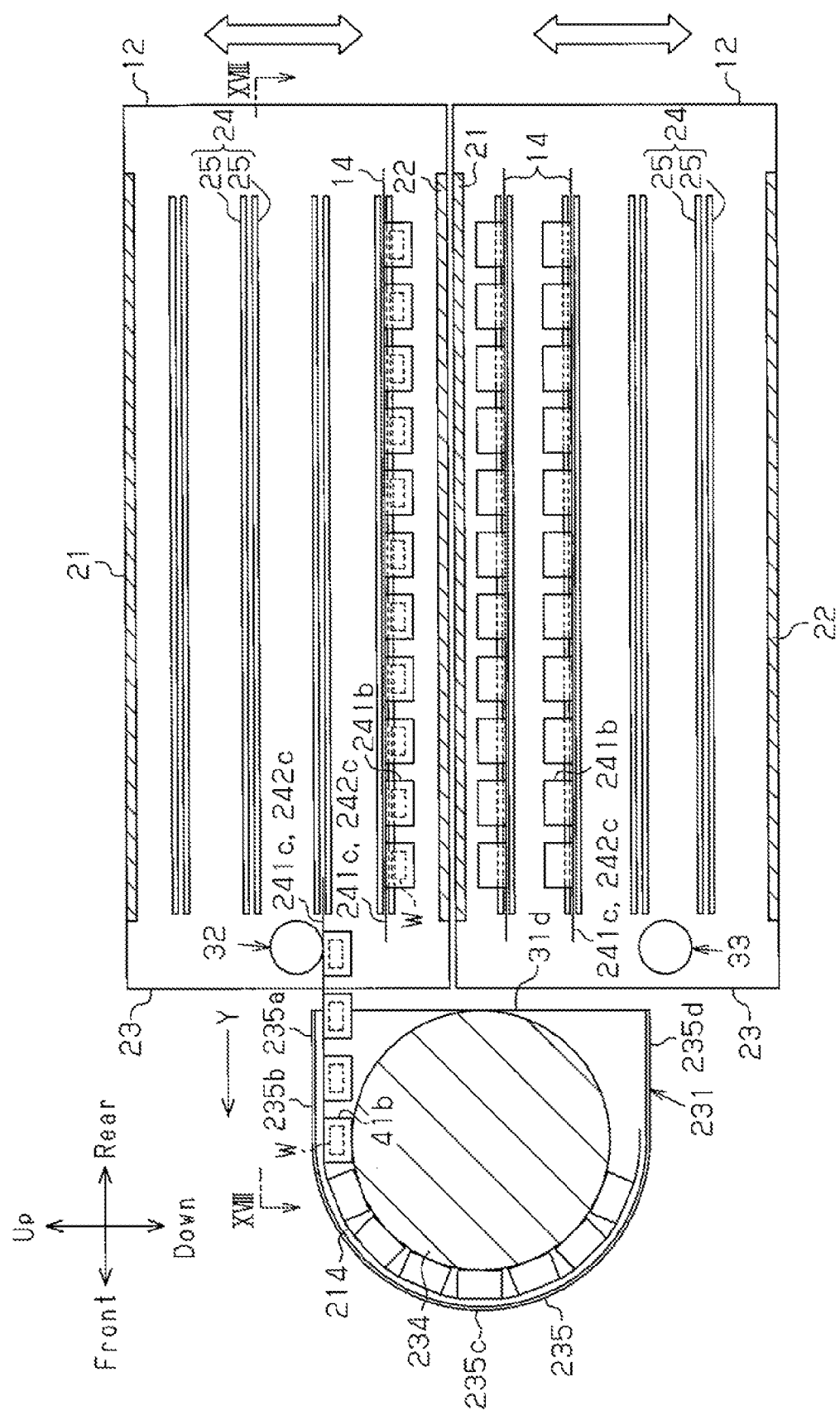
FIG. 17 is a cross-sectional view taken along line XVII-XVII in FIG. 16.

As shown in FIGS. 15 to 17, the reversal guide 231 includes a cylindrical inner guide 234 and an outer guide 235, in which the inner guide 234 is accommodated and supported. The outer guide 235 has a shape that opens toward the carrier cases 12. An upper wall 235a of the outer guide 235 is flat and extends perpendicular to the vertical direction. A window 235b through which workpieces W are unloaded is formed in the upper wall 235a by cutting out part of the upper wall 235a. The outer guide 235 is formed integrally with the upper wall 235a, and has a curved wall 235c, which is curved along the circumference of the inner guide 234. A fixed gap is arranged between an inner circumferential surface of the curved wall 235c and the circumferential surface of the inner guide 234 in a radial direction of the inner guide 234. Carriers 14 pass through between the circumferential surfaces. A lower wall 235d of the outer guide 235 is formed integrally with the curved wall 235c and is parallel to the upper wall 235a. In the reversal guide 231, an inner surface of the upper wall 235a, the inner circumferential surface of the curved wall 235c, an inner surface of the lower wall 235d, and the circumferential surface of the inner guide 234 function as guide surfaces for the carriers 14.

The upper wall 235a and the lower wall 235d of the outer guide 235 are respectively arranged in correspondence with the supports 24 of upper and lower carrier cases 12. For example, as shown in FIG. 17, when the upper wall 235a corresponds to the second stage support 24 from the bottom of the upper carrier case 12, the lower wall 235d corresponds to the second stage support 24 from the bottom of the lower carrier case 12. A carrier 14 that is drawn out from the upper carrier case 12 is sent into between the curved wall 235c and the inner guide 234, guided by the inner circumferential surface of the curved wall 235c and the circumferential surface of the inner guide 234, and reversed while moving downward. The carrier 14 guided by the inner circumferential surface of the curved wall 235c and the circumferential surface of the inner guide 234 is transferred to the support 24 of the lower carrier case 12, and the carrier 14 is accommodated in the carrier case 12. The size of the reversal guide 231 is adjusted in accordance with the distance between the upper and lower carrier cases 12 or the size of the carrier cases 12.

Carrier

Figure 19:
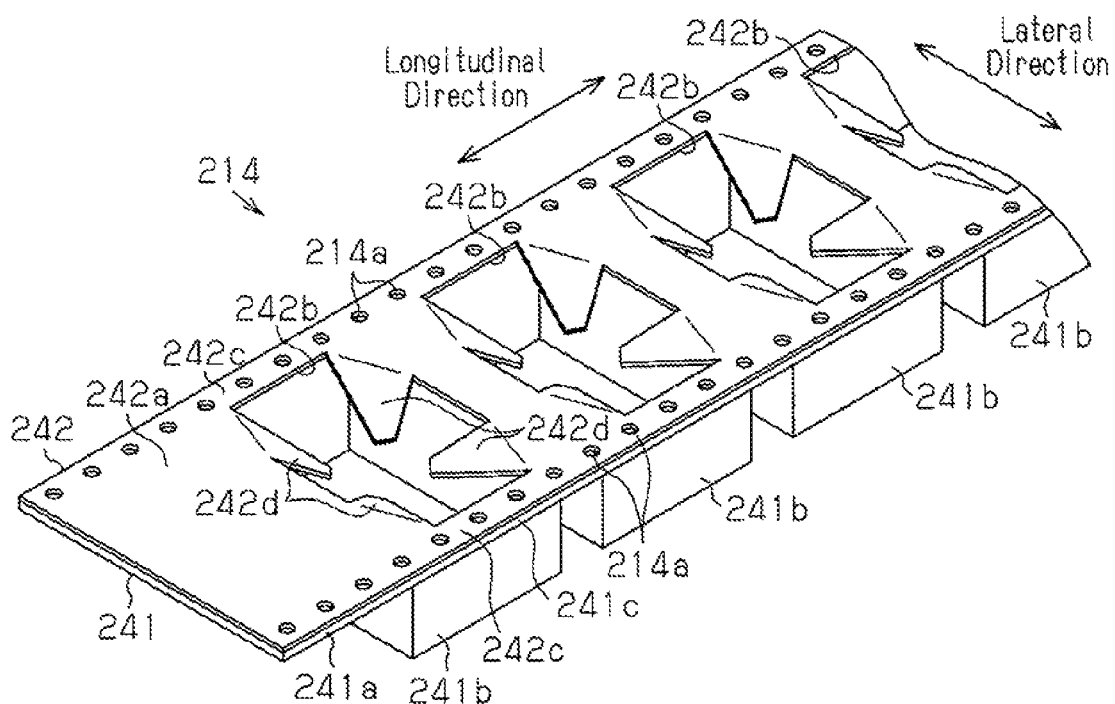
FIG. 19 is a perspective view of a carrier shown in FIG. 18.
Figure 20A:
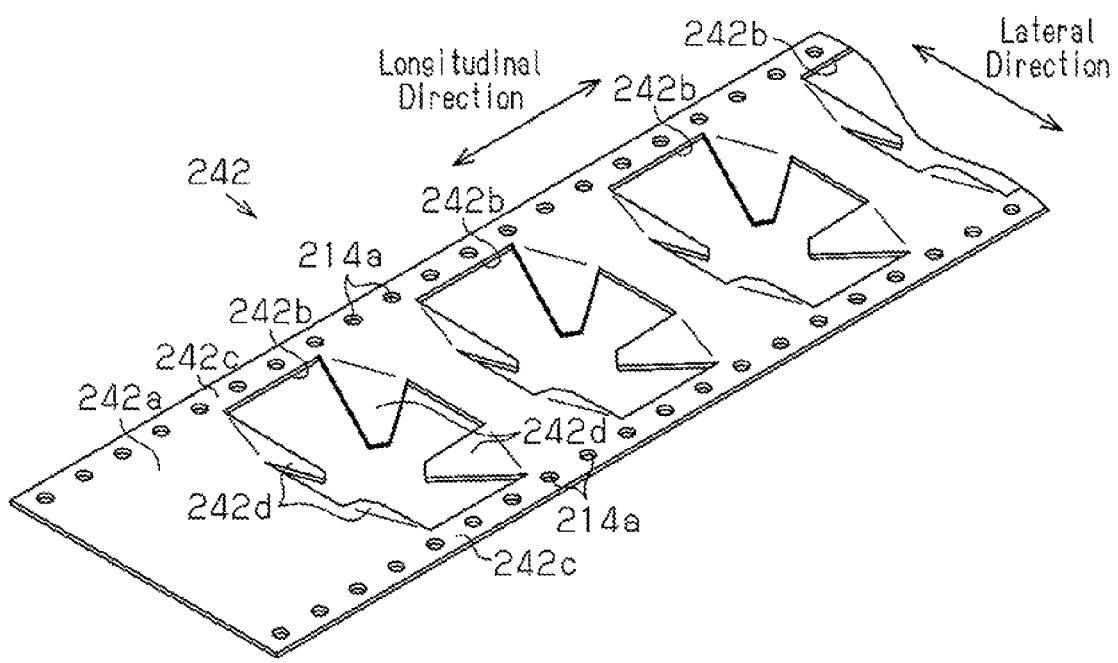
FIGS. 20A and 20B are exploded perspective views of the carrier shown in FIG. 19.
Figure 20B:
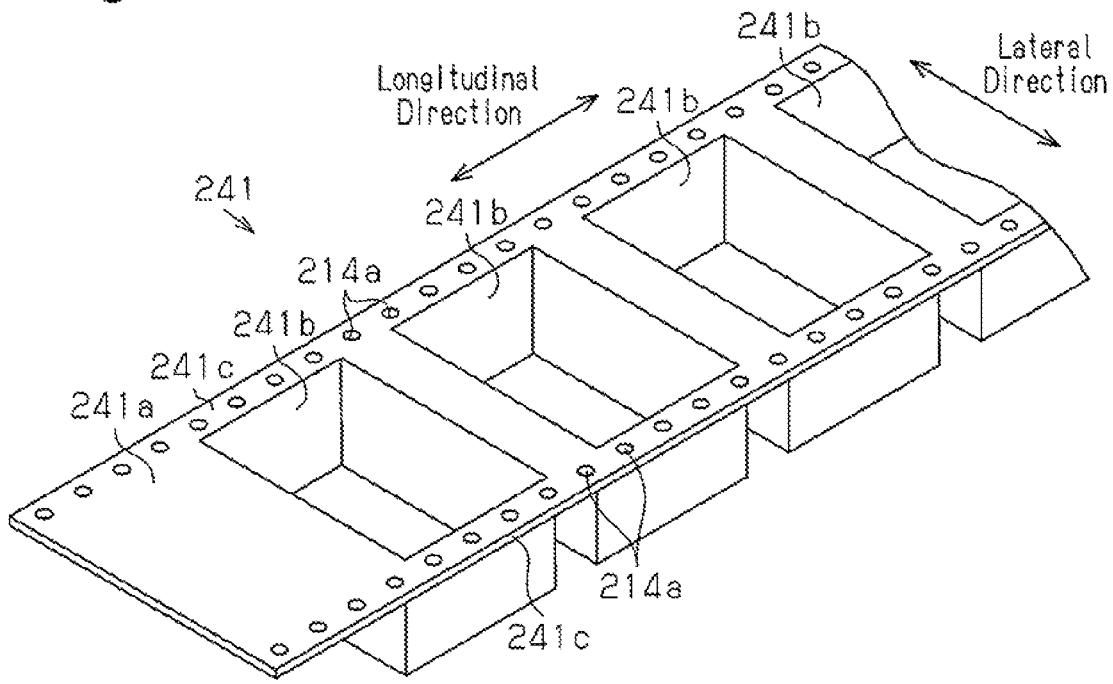

As shown in FIGS. 19 to 20B, the carrier 214 is as formed so that it can be transported as an integral member. A base member 241 and a holding member 242 are joined with each other to obtain the carrier 214. The base member 241 and the holding member 242 are both flexible and made of a synthetic resin such as polypropylene. In particular, the holding member 242 of the carrier 214 is shaped in correspondence with the outer shape of a workpiece W that is to be carried. In the fourth embodiment, the workpiece W that is carried is an output gear used for a motor or the like.

As shown in FIG. 20B, the base member 241 includes a reed-shaped flat plate 241a and a plurality of accommodation recesses 241b, which are formed in the flat plate 241a and arranged in a one-dimensional manner in the longitudinal direction. Each of the accommodation recesses 241b is rectangular as viewed from above and opens in the surface of the flat plate 241a. The flat plate 241a is wider than the accommodation recess 241b. That is, the flat plate 241a extends sideward from the opposite sides of the accommodation recess 241b in the lateral direction, which is perpendicular to the longitudinal direction, and the extended side portions of the flat plate 241a form flanges 241c.

Figure 18:
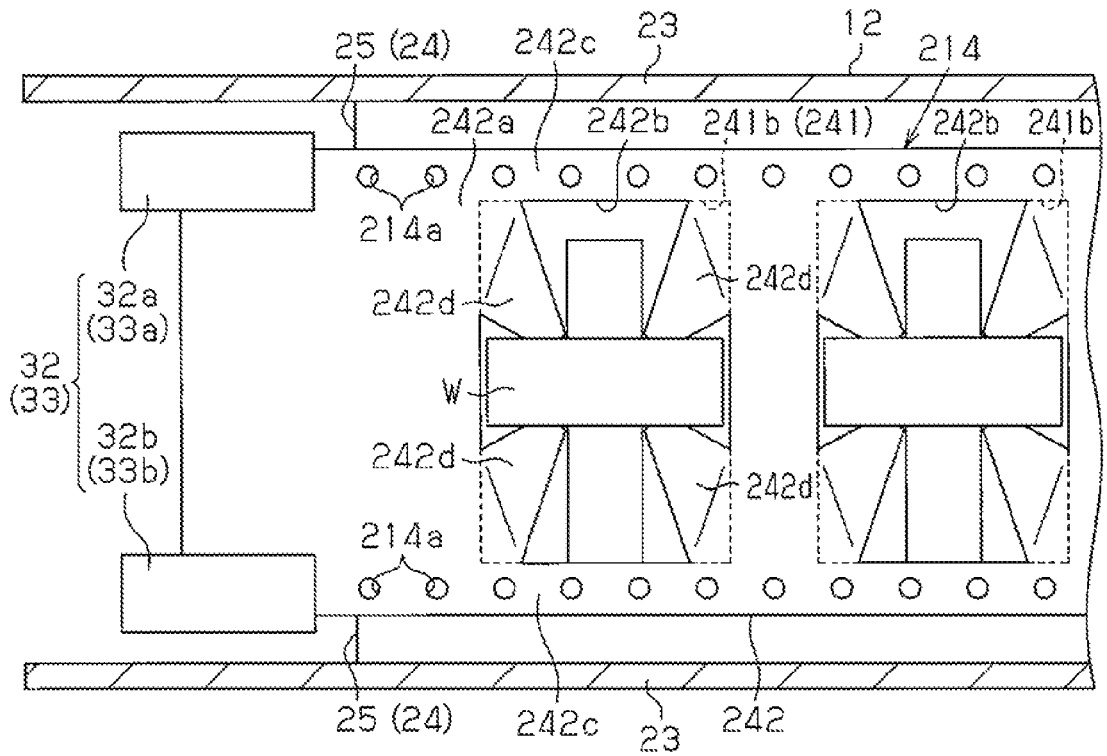
FIG. 18 is a cross-sectional view taken along line XVIII-XVIII in FIG. 17.

As shown in FIGS. 18 and 20A, the holding member 242 includes a reed-shaped flat plate 242a having a plurality of openings 242b formed along the longitudinal direction. The dimensions of the flat plate 242a of the holding member 242 in the longitudinal direction and the lateral direction are equal to the dimensions of the flat plate 241a of the base member 241 in the longitudinal direction and the lateral direction. Four extensions 242d (workpiece holding portions) extend into each opening 242b. The extensions 242d are formed so that they can hold a workpiece W (output gear, see FIG. 18). More specifically, the extensions 242d extend inward from the four corners of the substantially rectangular opening 242b toward the center of the opening 242b, and the width of the extension 242d is decreased (tapered) toward its distal end. The base of each extension 242d is slightly bent toward a rear side of the flat plate 242a. Thus, the extensions 242d project toward the rear from the flat plate 242a (see FIG. 21).

Figure 21:
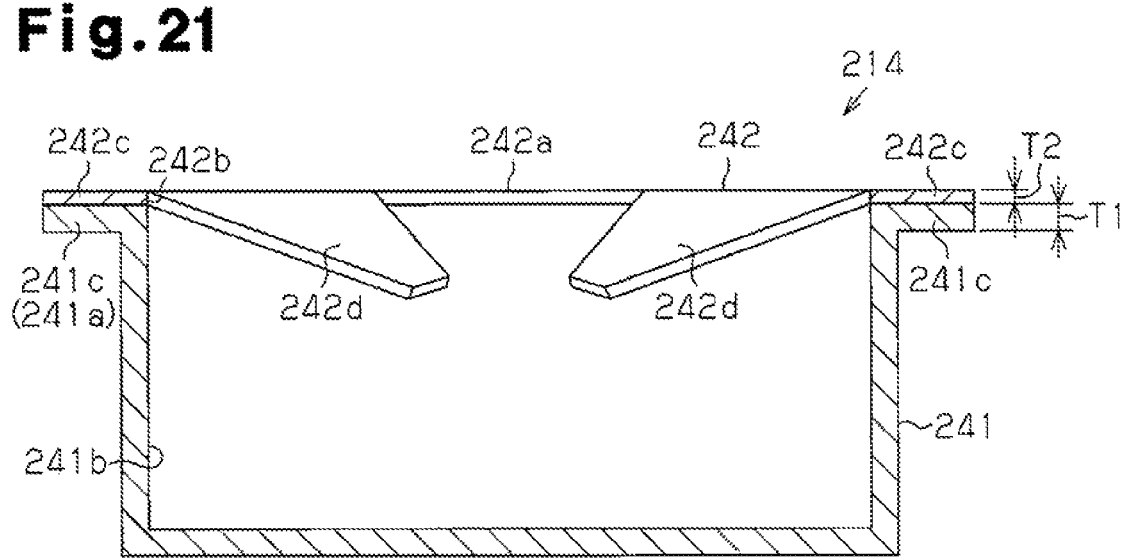
FIG. 21 is a cross-sectional view of the carrier shown in FIG. 19.

As shown in FIGS. 19 and 21, the carrier 214 is formed by superimposing the flat plate 242a of the holding member 242 on the flat plate 241a of the base member 241. The flanges 241c of the base member 241 and flanges 242c at the lateral side of the flat plate 242a of the holding member 242 in the lateral direction are stacked with each other in the vertical direction. A plurality of engaging holes 214a are formed in the flanges 241c and 242c and arranged at equal intervals in the longitudinal direction. The teeth of the two gears 32a and 32b and two gears 33a and 33b are inserted into the engaging holes 214a. Rotation of the two gears 32a and 32b or the two gears 33a and 33b moves the carrier 214.

The openings 242b of the holding member 242 are formed at positions corresponding to the accommodation recesses 241b of the base member 241. Since the extensions 242d extend from the openings 242b toward the rear of the holding member 242 (toward the base member 241) as described above, the extensions 242d enter the accommodation recesses 241b of the base member 241. The dimensions of the openings 242b of the holding member 242 correspond to the openings of the accommodation recesses 241b of the base member 241. By engaging the bases of the extensions 242d of the openings 242b and inner surfaces of the accommodation recesses 241b with each other, the holding member 242 is positioned relative to the base member 241 in the longitudinal direction and the lateral direction.

In the carrier 214 including the base member 241 and the holding member 242, when workpieces W are inserted into the openings 242b from the front surface of the holding member 242, the extensions 242d of the openings 242b abut against the workpieces W and are bent toward the rear. The resilient force generated when bending the extensions 242d hold the workpieces W in the accommodation recesses 241b. As shown in FIG. 17, in the upper carrier case 12, a carrier 214 holding the workpieces W is accommodated in the carrier case 12 in a state in which the accommodation recesses 241b extend downward. In this state, the superposed flanges 241c and 242c are inserted between one set of the crosspieces 25 of the carrier case 12.

As shown in FIG. 21, the thickness T2 of the holding member 242 (thickness of flat plate 242a) is less than the thickness T1 of the base member 241 (thickness of flat plate 241a). In the fourth embodiment, in the holding member 242, the flat plate 242a and the extensions 242d have the same thickness. In the base member 241, the flat plate 241a and the walls of the accommodation recesses 241b have the same thickness. By increasing the thickness T1 of the base member 241, the strength of the base member 241 can be ensured. Thus, it becomes easy to maintain the shape of the carrier 214 formed by superposing the base member 241 and the holding member 242. Since the strength of the base member 241 is increased, the life of the base member 241 can be prolonged. This facilitates reuse of the base member 241. When a workpiece W is resiliently held by the deformation of the extensions 242d of the holding member 242 as in the fourth embodiment, the extensions 242d can easily be deformed by decreasing the thickness T2 of the holding member 242 (extensions 242d) so that the workpieces W can be held in a preferable manner.

Workpiece Supplying Procedures

Next, the procedures for supplying workpieces carried out by the workpiece supplying apparatus 211 will be described.

First, workpieces W are accommodated in the accommodation recesses 241b of a carrier 214. Here, the extensions 242d of the holding member 242 abut against the workpieces W inserted into the accommodation recesses 241b in the bent state thereby resiliently holding the workpieces W. In this structure, the workpieces W can be stably held without thermal welding a cover tape to the carrier 214 to close the accommodation recesses 241b. This facilitates reuse of the carrier 214 while preventing the workpieces W from falling out from the carrier 214.

The transportation of the carrier case 212 with the automatic transportation vehicle P and the case-moving robot arm R1 is performed in the same manner as the transportation of the carrier case 12 in the third embodiment. Thus, the transportation will not be described in detail.

As shown in FIGS. 16 and 17, when the carrier cases 12 are arranged one above the other in the vertical direction on the workbench S, the gears 32a and 32b are engaged with the engaging holes 214a of the uppermost carrier 214 in the upper carrier case 12 (carrier case 12 arranged at the unloading position) (see FIG. 18).

Next, the driving source is operated to rotate the first and second gear pairs 32 and 33 in the clockwise direction. In this state, the carrier 214 accommodated in the upper carrier case 12 is engaged with the first gear pair 32 and the carrier 214 is straightly drawn out in a forward direction (drawing direction Y) and inserted into the reversal guide 231. FIG. 17 shows a state in which two of the carriers 214 from the top that were accommodated in the upper carrier case 12 have already been drawn out from the carrier case 12 and collected in the lower carrier case 12 (collecting case). Further, a third carrier 214 from the top is being drawn out.

Next, when a workpiece W held by the carrier 214 reaches the unloading position, the workpiece unloading robot arm R2 (see FIG. 15) unloads the workpiece W from the accommodation recess 241b through the window 235b of the outer guide 235, and transfers the workpiece W to the working position Sa (see FIG. 15) located in front of the reversal guide 231. The unloading of a workpiece W is carried out by the robot arm R2 whenever the workpiece W reaches the unloading position. The unloading position of a workpiece W is set below the window 235b. A carrier 214 drawn out from the upper carrier case 12 enters between the curved wall 235c of the outer guide 235 and the inner guide 234. Then, the carrier 214 is guided by the inner circumferential surface of the curved wall 235c and the circumferential surface of the inner guide 234 and moved toward the lower wall 235d where its traveling direction is reversed.

The carrier 214 of which traveling direction has been reversed projects rearward from the outer guide 235 along the lower wall 235d and engages with the second gear pair 33. The carrier 214 is moved rearward by the second gear pair 33 into the lower carrier case 12. In this state, the flanges 241c and 242c of the carrier 214 are inserted between the set of crosspieces 25 of the lower carrier case 12. This holds the carrier 214 in the lower carrier case 12. The carrier 214 is accommodated in the lower carrier case 12 in a state in which the accommodation recesses 241b extend upward.

In this manner, when the collection of one carrier 214 is completed, the upper and lower carrier cases 12 are lifted by one level by the support member, and the next carrier 214 is drawn out to unload the workpieces W from the carrier 214. When all of the carriers 214 in the upper carrier case 12 are drawn out and collected in the lower carrier case 12, the unloading of the workpieces W from one carrier case 12 is completed.

Then, the lower carrier case 12 accommodating empty carriers 214 are transferred to the holding surface Pc of the automatic transportation vehicle P by the case-moving robot arm R1. Then, the upper carrier case 12 from which all of carriers 214 have been drawn out (carrier case 12 located at the unloading position) is moved to the lower collecting position by the robot arm R1. A carrier case 12 including workpieces on the holding surface Pc of the automatic transportation vehicle P is then transferred to the upper unloading position by the robot arm R1. The unloading steps of the workpieces W is repeated a predetermined number of times. The automatic transportation vehicle P counts the number of carrier cases 12 accommodating workpieces that are moved from the holding surface Pc to the workbench S. When the number reaches a predetermined number, the automatic transportation vehicle P automatically moves to the next workbench or the loading station.

Advantage of Fourth Embodiment

The fourth embodiment has the following advantages in addition to advantage (8) of the third embodiment.

(10) The flexible carrier 214 in which a plurality of workpieces W can be accommodated so that it can be transported as an integral member obtained by joining the base member 241 and the holding member 242 with each other. The base member 241 includes the accommodation recesses 241b that are arranged in a one-dimensional manner. In the holding member 242, the extensions 242d (workpiece holding portions) that hold the workpieces W are provided in the accommodation recesses 241b. Hence, each accommodation recess 241b of the base member 241 functions as an outer shell of the workpiece holding portion, and a workpiece W is held by the extensions 242d of the holding member 242 in the accommodation recess 241b. This structure stably holds the workpiece W without the need to thermally weld a cover tape to the carrier 214 to close the accommodation recess 241b. This facilitates reuse of the carriers 214 while preventing workpieces W from falling out from the carrier 214. Thus, manufacturing costs can be reduced. This can be applied to various types of workpieces W just by changing the holding member 242 while using the same base member 241. This also reduces the manufacturing costs.

(11) The base member 241 and the holding member 242 respectively include the flanges 241c and 242c. The carrier 214 can be moved in a state in which the flange 241c of the base member 241 and the flange 242c of the holding member 242 are superposed with each other. Since the carrier 214 can be held and moved by the superposed flanges 241c and 242c, the carrier 214 can easily be held (moved).

(12) The extensions 242d extend from the flanges 242c of the holding member 242, and the extensions 242d abut against a workpieces W inserted into the accommodation recesses 241b in a deformed state thereby resiliently holding the workpieces W. Since the workpieces W are resiliently held by the extensions 242d of the holding member 242, the workpieces W can be held with a simple structure.

(13) The thickness T2 of the holding member 242 is less than the thickness T1 of the base member 241. Thus, strength can be ensured by increasing the thickness T1 of the base member 241. This easily sustains the shape of the carrier 214, which is obtained by superposing the base member 241 and the holding member 242. Since the lifetime of the base member 241 can be increased, it is easy to reuse the base member 241. When the workpiece W is resiliently held by deformation of the extensions 242d of the holding member 242, the thickness T2 of the holding member 242 can be decreased to facilitate deformation thereby allowing the workpiece W to be held in a preferable manner.

(14) The workpiece supplying apparatus includes the carrier case 12, which accommodates the carriers 214, the first gear pair 32, which draws out each carrier 214 from the carrier case 12 to the workpiece unloading position, the reversal guide 231, which guides the carrier 214 drawn out by the first gear pair 32 in a direction differing from the drawing direction Y while bending the carrier 214, and the second gear pair 33, which sends the carrier 214 guided by the reversal guide 231 into the lower carrier case 12 (collecting case). Since the workpieces W held by the carrier 214 drawn out by the first gear pair 32 can be unloaded at a constant position (same position), the equipment can be reduced in size.

Other Embodiments

It should be apparent to those skilled in the art that the present invention may be embodied in many other specific forms without departing from the spirit or scope of the invention. Particularly, it should be understood that the present invention may be embodied in the following forms.

Figure 10:
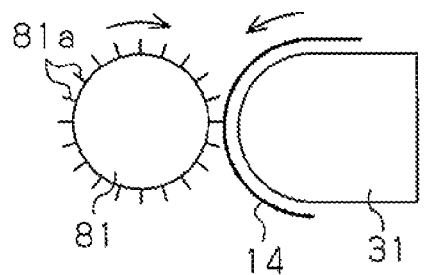
FIG. 10 is a schematic diagram showing a reversal guide in another embodiment.
Figure 11:
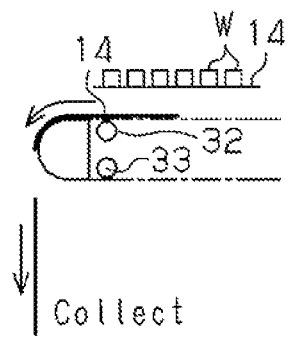
FIG. 11 is a schematic diagram showing the angle of change in the direction of a carrier in another embodiment.

In the first and second embodiments, the two side edges of a carrier 14 drawn out from the upper carrier case 12 are guided by the two guide grooves 43 of the reversal guide 31. Thus, the carrier 14 can be reversed while preventing the carrier 14 from falling off. This operation can also be carried out even if the two guide grooves 43 are omitted. More specifically, as shown in FIG. 10, two gears 81 (only one shown in FIG. 10) are arranged in front of the reversal guide 31. The gears 81 have larger diameters then the two gears 32a and 32b of the first gear pair 32 and the two gears 33a and 33b of the second gear pair 33. The two gears 81 are respectively arranged in correspondence with the two side edges of the carrier 14 drawn out from the upper carrier case 12. Engagement of the teeth 81a of the two gears 81 with the holes 67 formed in the two side edges of the drawn out carrier 14 guides the carrier 14. The gears 81 may be driven by a driving source (not shown) or be rotated by the movement of the drawn out carrier 14.

In the first to fourth embodiments, the carrier 14 drawn out from the upper carrier case 12 is reversed by 180° as it moves and is collected in the lower carrier case 12. However, the angle of the change in the direction of the carrier 14 is not limited to 180°. For example, the direction of the carriers 14 may be changed by 90° with respect to the drawing direction from the upper carrier case 12, and the carriers 14 may be sequentially collected.

In the first to fourth embodiments, the carrier cases 12 may be lifted and lowered by the support member (not shown) instead of the lifting mechanism (not shown).

In the first and second embodiments, the shapes of the holding walls 63 and 71 may be changed as required in accordance with the outer shape of the workpiece W.

Figures 12A, 12B, 12C, 12D:
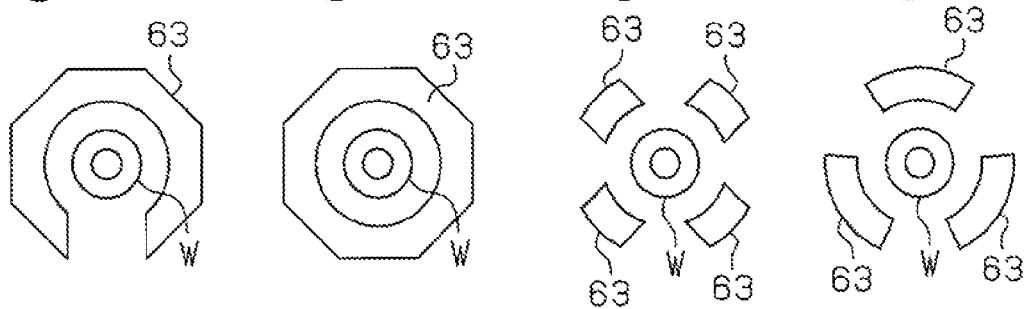
FIGS. 12A to 12D are plan views of holding walls in other embodiments.

In the first embodiment, the holding wall 63 may be modified as follows. As shown in FIG. 12A, for example, the two holding walls 63 may be connected to each at one of their ends to form a single holding wall so that only one location is open. Alternatively, the two holding walls 63 may be connected to each other to form a single holding wall as shown in FIG. 12B. Further, each of the two holding walls 63 may be divided into two pieces, and a total four holding walls may hold the workpiece W as shown in FIG. 12C. Additionally, three holding walls 63 may hold the workpiece W as shown in FIG. 12D.

Figure 13A:
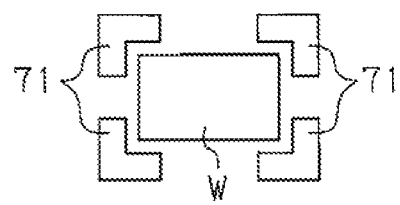
FIGS. 13A and 13B are plan views of holding walls in other embodiments.
Figure 13B:
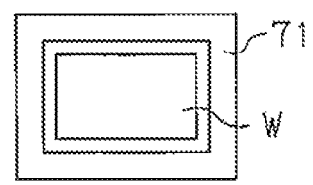

In the second embodiment, the holding wall 71 may be modified. For example, four holding walls 71 may respectively hold the four corners of workpieces W as shown in FIG. 13A. Alternatively, a single holding wall 71 may surround the periphery of workpieces W as shown in FIG. 13B.

Although the carrier 14 holds the plurality of workpieces W in a single line in the first to fourth embodiments, the carrier 14 may hold two rows, three rows, or more rows of workpieces W.

In the first to fourth embodiments, a carrier case 12 from which a carrier 14 is drawn out is used as the collecting case. Alternatively, a case dedicated for collection and differing from the carrier case 12 may be used as the collecting case.

In the first to fourth embodiments, a carrier 14 (214) accommodated in the lower carrier case 12 may be returned to the upper carrier case 12 by reversing the rotation of the first gear pair 32 and the second gear pair 33.

Although the third embodiment is described using the carrier case 12 of the first embodiment, the carrier case 12 may be changed to the carrier case 12 of the second embodiment. This would obtain advantage (7) of the second embodiment. Even when the carrier case 12 of the second embodiment is used in the third embodiment, the transportation of the carrier case 12 by the automatic transportation vehicle P, the transfer of the carrier case 12 by the robot arm R1, the unloading of the carrier 14, and the collection of the carrier 14 are the same as the third embodiment.

In the third embodiment, the holding portion 62 projects toward the front of the carrier 14 but not limited in such a manner. For example, the holding portion may project toward the rear side of the carrier 14, and the holding portion may be a cup-shaped and be open so that the workpiece W can be unloaded from the front side of the carrier 14.

In the third and fourth embodiments, the first gear pair 32, which serves as the drawing portion, and the second gear pair 33, which serves as the transferring portion, may be arranged on the workbench S or on each carrier case 12.

In the third and fourth embodiments, for example, a grasping portion that can be grasped by the robot arm R may be arranged the top wall 21 (or side wall 23) of the carrier case 12. This makes it easy to grasp the carrier case 12 and allows the robot arm R1 to stably carry the carrier case 12.

In the third and fourth embodiments, the carrier case 12 is moved from the unloading position to the collecting position by the robot arm R1 but the present invention is not limited in such a manner. For example, the workbench S may be provided with a lifting mechanism that differs from the robot arm R1, and the carrier case 12 may be moved by the lifting mechanism from the unloading position to the collecting position.

In the third and fourth embodiments, the base portion R1$a$ of the robot arm R1 is fixed in an immovable manner to the holding surface Pc of the automatic transportation vehicle P but the present invention is not limited in such a manner. For example, the robot arm R1 may be movable in the direction in which the carrier cases 12 are arranged. In such a structure, the arm portion R1$b$ would be able to reach the two ends of the carrier cases 12 even if the arm portion R1$b$ of the robot arm R1 cannot be expanded or contracted.

In the third and fourth embodiments, the case-moving robot arm R1 is arranged on the automatic transportation vehicle P. However, the present invention is not limited in such a manner. The robot arm R1 may be arranged, for example, on the workbench S.

In the third and fourth embodiments, the plurality of carrier cases 12 is arranged in the direction (transporting direction X) perpendicular to the drawing direction Y on the automatic transportation vehicle P. However, the carrier cases 12 may be arranged in the drawing direction Y on the automatic transportation vehicle P.

Although the transporting direction X of the automatic transportation vehicle P is perpendicular to the drawing direction Y in the third and fourth embodiments, the invention is not limited in such a manner, and the transporting direction X may be parallel to the drawing direction Y.

In the third and fourth embodiments, the automatic transportation vehicle P is used as a transportation unit, which transports the carrier cases 12 to a location in the vicinity of the workbench S. However, the present invention is not limited in such a manner. For example, a belt conveyer may be used instead.

Figure 22:
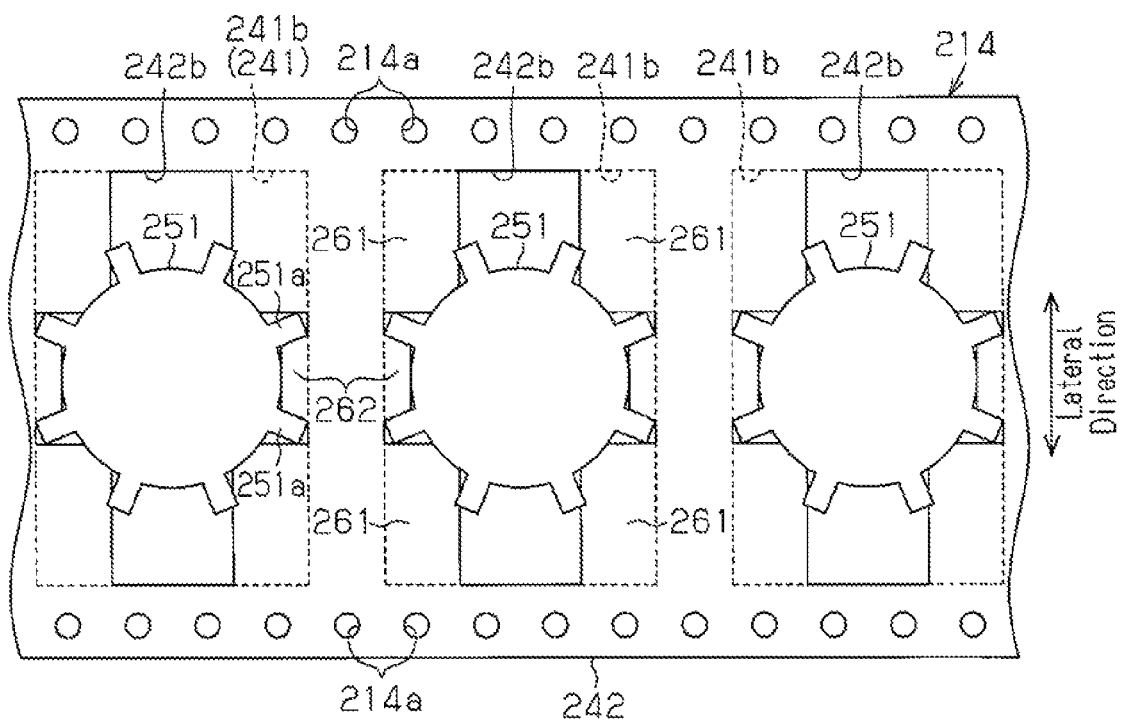
FIG. 22 is a plan view of a carrier of another embodiment.

In the fourth embodiment, the shape of the workpiece holding portion of the holding member 242 may be changed in accordance with the outer shape of the workpieces W. FIG. 22 shows the holding member 242 when the carried workpiece is a commutator 251 used for a motor or the like. As shown in FIG. 22, the commutator 251 is cylindrical and has a circumferential surface including a plurality of risers 251$a$ arranged at equal intervals in the circumferential direction. A first extended walls (extensions) 261, serving as workpiece holding portion, is arranged at each of the four corners of each rectangular opening 242$b$ of the holding member 242. Each of the first extended walls 261 extends into the opening 242$b$ between the risers 251$a$, abuts against the risers 251$a$ in the circumferential direction, and abuts the circumferential surface of the commutator 251 in the radial direction. Second extended walls (extensions) 262 extending into the openings 242$b$ between the first extended walls 261 arranged in the lateral direction in each opening 242$b$. Each second extended wall 262 also functions as the workpiece holding portion. Like the first extended wall 261, the second extended wall 262 extends into between the risers 251$a$, abuts against the risers 251$a$ in the circumferential direction, and abuts against the circumferential surface of the commutator 251 in the radial direction. The commutator 251 is stably held by the first and second extended walls 261 and 262. Such a structure has the same advantages as the fourth embodiment.

In the fourth embodiment, the accommodation recess 241$b$ has a rectangular shape as viewed from above but is not limited to such a shape. The shape of the accommodation recess 241$b$ may be changed as required in accordance with the outer shape of the workpiece W.

In the fourth embodiment, guide grooves may be formed in the upper wall 235$a$ and the lower wall 235$d$ of the outer guide 235 to guide the flanges 241$c$ and 242$c$ of the carrier 214.

The carrier case 12 is moved between the holding surface Pc of the automatic transportation vehicle P and the workbench S by the case-moving robot arm R1 in the third and fourth embodiments. However, the present invention is not limited in such a manner. For example, the automatic transportation vehicle P or the workbench S may include a pushing device, and the carrier case 12 may be moved by the pushing device.

The present examples and embodiments are to be considered as illustrative and not restrictive, and the invention is not to be limited to the details given herein, but may be modified within the scope and equivalence of the appended claims.

The invention claimed is:

1. A workpiece supplying apparatus comprising: a plurality of flexible carriers, wherein each of the carriers includes a base, which has a front surface and a rear surface, and a plurality of workpiece holding portions projecting from the front surface of the base, and the workpiece holding portions are arranged in a one-dimensional manner and respectively hold workpieces; a carrier case that accommodates the carriers; a drawing portion that draws out each of the carriers from the carrier case along a drawing direction toward a workpiece unloading position; a guide that guides each of the carriers drawn out by the drawing portion in a direction that differs from the drawing direction while bending the carrier so that the rear surface is arranged at an inner side; and a collecting portion that collects the carrier guided by the guide.

2. The workpiece supplying apparatus according to claim 1, wherein the guide guides the carrier in a direction opposite to the drawing direction.

3. The workpiece supplying apparatus according to claim 1, wherein each of the workpiece holding portions includes at least two holding walls, each of the workpieces includes two held portions located on opposite sides in the drawing direction of the carriers, and the at least two holding walls each surround at least part of the corresponding held portion.

4. The workpiece supplying apparatus according to claim 3, wherein the carrier includes two edge portions extending along a longitudinal direction, the carrier case includes two side walls and a plurality of crosspiece sets, the two side walls each include an inner surface facing the inner surface of the other side wall in a direction perpendicular to the drawing direction, and each of the crosspiece sets is arranged on one of the inner surfaces, each of the crosspiece sets includes two crosspieces that hold one of the two edge portions of the carrier, each of the crosspieces extends along the drawing direction of the carrier and curves downward in the longitudinal direction to be convex, and when each of the edge portions is held between the two crosspieces, the carrier is curved along the crosspieces so that the distance between distal ends of the at least two holding walls is shortened thereby holding the workpiece between the at least two holding walls.

5. The workpiece supplying apparatus according to claim 3, wherein the carrier includes two edge portions extending along a longitudinal direction, the carrier case includes two side walls and a plurality of crosspieces, the two side walls each include an inner surface facing the inner surface of other side wall in a direction perpendicular to the drawing direction, and each of the crosspieces is arranged on one of the inner surfaces, each of the crosspieces supports one of the two edge portions of the carrier, each of the crosspieces extends along the drawing direction of the carrier and curves downward in the longitudinal direction to be convex, and when each the two edge portions are supported by the crosspieces, the carrier is curved downward along the crosspieces so that the weight of the workpiece shortens the distance between distal ends of the at least two holding walls thereby holding the workpiece between the at least two holding walls.

6. The workpiece supplying apparatus according to claim 1, wherein the collecting portion includes a collecting case, and a transferring portion that transfers the carrier guided by the guide toward the collecting case.

7. A method for supplying workpieces, the method comprising: preparing a plurality of flexible carriers, wherein each of the carriers includes a base, which has a front surface and a rear surface, and a plurality of workpiece holding portions projecting from the front surface of the base, and the workpiece holding portions are arranged in a one-dimensional manner; holding the workpieces respectively in the workpiece holding portions; accommodating the carriers in a carrier case; drawing each of the carriers from the carrier case toward a workpiece unloading position along a drawing direction; changing a direction of the drawn out carrier to a direction that differs from the drawing direction while bending the carrier so that the rear surface is arranged at an inner side; and collecting the carrier of which direction has been changed.

8. A workpiece supplying apparatus comprising: a plurality of flexible carriers, wherein each of the carriers includes a base, which has a front surface and a rear surface, and a plurality of workpiece holding portions arranged on the front surface of the base, and the workpiece holding portions are arranged in a one-dimensional manner and respectively hold workpieces; a plurality of carrier cases, each accommodating the carriers; a drawing portion that draws out each of the carriers from each of the carrier cases along a drawing direction toward a workpiece unloading position; a guide arranged on a workbench, wherein the guide guides each of the carriers drawn out by the drawing portion in a direction that differs from the drawing direction while bending the carrier; a collecting case that accommodates the carriers; a collecting portion that sends each of the carrier guided by the guide into the collecting case; a transportation unit that holds the carrier cases and transports the carrier cases to the vicinity of the workbench; and a robot arm that moves the carrier cases and the collecting case, wherein the robot arm arranges the carrier case, which accommodates the workpieces, of the carrier cases held by the transportation unit at a position corresponding to the guide, and the robot arm returns the collecting case to the transportation unit.

9. The workpiece supplying apparatus according to claim 8, wherein the workpiece holding portions project from the front surface of the carrier, and the guide guides each of the carriers drawn out by the drawing portion in a direction that differs from the drawing direction while bending the carrier so that the rear surface is arranged at an inner side.

10. The workpiece supplying apparatus according to claim 8, wherein the workpieces are arranged in a line along the drawing direction in the corresponding carrier case.

11. The workpiece supplying apparatus according to claim 8, wherein the guide guides the carrier in a direction opposite to the drawing direction.

12. The workpiece supplying apparatus according to claim 8, wherein each of the workpiece holding portions includes at least two holding walls, each of the workpieces includes two held portions located on opposite sides in the drawing direction of the carriers, and the at least two holding walls each surround at least part of the corresponding held portion.

13. The workpiece supplying apparatus according to claim 12, wherein the carrier includes two edge portions extending along a longitudinal direction, the carrier case includes two side walls and a plurality of crosspiece sets, the two side walls each include an inner surface facing the inner surface of the other side wall in a direction perpendicular to the drawing direction, and each of the crosspiece sets is arranged on one of the inner surfaces, each of the crosspiece sets includes two crosspieces that hold one of the two edge portions of the carrier, each of the crosspieces extends along the drawing direction of the carrier and curves downward in the longitudinal direction to be convex, and when each of the edge portions is held between the two crosspieces, the carrier is curved along the crosspieces so that the distance between distal ends of the at least two holding walls is shortened thereby holding the workpiece between the at least two holding walls.

14. The workpiece supplying apparatus according to claim 12, wherein the carrier includes two edge portions extending along a longitudinal direction, the carrier case includes two side walls, each including an inner surface facing the inner surface of other side wall in a direction perpendicular to the drawing direction, and a plurality of crosspieces arranged on one of the inner surfaces, each of the crosspieces supports one of the two edge portions of the carrier, each of the crosspieces extends along the drawing direction of the carrier and is curved downward in the longitudinal direction to be convex, and when each the two edge portions are supported by the crosspieces, the carrier is curved downward along the crosspieces so that the weight of the workpiece shortens the distance between distal ends of the at least two holding walls thereby holding the workpiece between the at least two holding walls.

15. The workpiece supplying apparatus according to claim 8, wherein the collecting portion is a transferring portion that transfers the carriers guided by the guide toward the collecting case.

16. The workpiece supplying apparatus according to claim 8, wherein the transportation unit is a transportation vehicle, and the robot arm is arranged on the transportation vehicle.

17. The workpiece supplying apparatus according to claim 8, wherein the carrier case is used as the collecting case.

18. A method for supplying workpieces, the method comprising: preparing a plurality of flexible carriers, wherein each of the carriers includes a base, which has a front surface and a rear surface, and a plurality of workpiece holding portions arranged on the front surface of the base, and the workpiece holding portions are arranged in a one-dimensional manner; holding the workpieces respectively in the workpiece holding portions; accommodating the carriers in carrier cases; transporting the carrier cases accommodating the workpieces to the vicinity of a workbench with a transportation unit; moving the carrier cases from the transportation unit to the workbench with a robot arm; drawing each of the carriers from the carrier cases toward a workpiece unloading position along a drawing direction at the workbench; changing a direction of the drawn out carrier to a direction that differs from the drawing direction while bending the carrier; collecting the carrier of which direction has been changed in a collecting case; and returning the collecting case to the transportation unit with the robot aim.

19. A workpiece supplying apparatus comprising a flexible carrier, wherein the carrier can accommodate a plurality of workpieces and includes a base member and a holding member joined with the base member, the base member and the holding member are transported integrally, the base member includes a plurality of accommodation recesses arranged in a one-dimensional manner, the holding member includes a plurality of workpiece holding portions, and each of the workpiece holding portions is located in a corresponding one of the accommodation recesses and holds a corresponding one of the workpieces, the workpiece supplying apparatus further comprising: a carrier case that accommodates a plurality of carriers; a drawing portion which draws out the carriers from the carrier case toward a workpiece unloading position along a drawing direction; a guide that guides the carrier drawn out from the drawing portion in a direction that differs from the drawing direction while bending the carrier; a collecting case that accommodates the carriers; and a collecting portion that transfers the carrier guided by the guide to the collecting case.

20. The workpiece supplying apparatus according to claim 19, wherein the base member and the holding member each include a flange, and the flange of the base member and the flange of the holding member are superposed with each other.

21. The workpiece supplying apparatus according to claim 20, wherein each of the workpiece holding portions is an extension extending from the flange of the holding member, the extension abuts against the workpiece inserted into the accommodation recess in a deformed state to resiliently hold the workpiece.

22. The workpiece supplying apparatus according to claim 19, wherein the holding member is thinner than the base member.

23. The workpiece supplying apparatus according to claim 19, further comprising: a transportation unit that holds the carrier cases and transports the carrier cases to the vicinity of the workbench where the guide is arranged; and a robot arm that moves the carrier cases and the collecting case, wherein the robot arm arranges the carrier case, which accommodates the workpieces, of the carrier cases held by the transportation unit at a position corresponding to the guide, and the robot arm returns the collecting case to the transportation unit.

* * * * *